INVENTORS
ROBERT P. CROW &
KAY K. FUJIMOTO

May 23, 1967  R. P. CROW ET AL  3,321,757
DME WITH GROUND SPEED AND TIME-TO-STATION INDICATOR
Filed Aug. 17, 1965  11 Sheets-Sheet 11
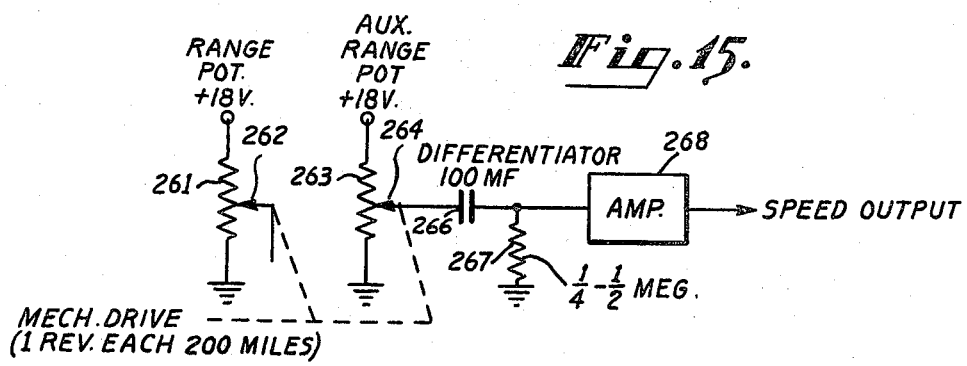
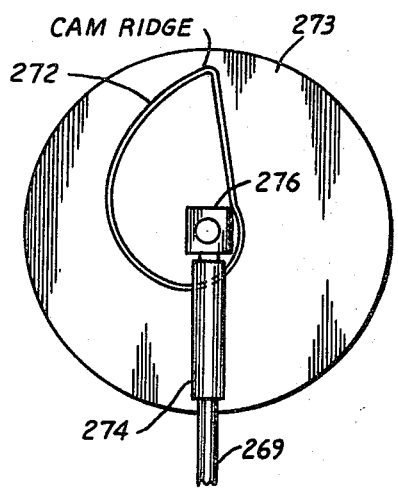
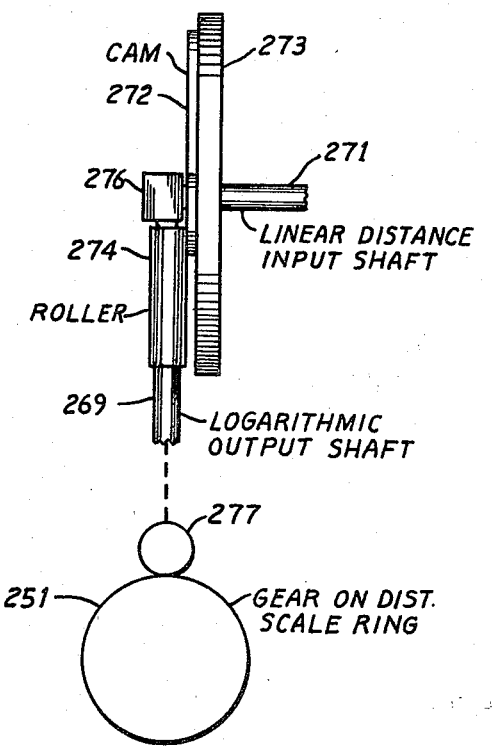
INVENTORS
ROBERT P. CROW &
KAY K. FUJIMOTO
BY Lloyd M. Harris
Attorney

# United States Patent Office 3,321,757
Patented May 23, 1967

3,321,757
DME WITH GROUND SPEED AND TIME-TO-STATION INDICATOR
Robert P. Crow, Los Angeles, and Kay K. Fujimoto, Granada Hills, Calif., assignors to Radio Corporation of America, a corporation of Delaware
Filed Aug. 17, 1965, Ser. No. 480,356
5 Claims. (Cl. 343—7.3)

Our invention relates to improved ground speed measuring apparatus and to time-to-station determining apparatus, particularly as applied to Distance Measuring Equipment (DME).

DME is airborne radar equipment of the pulse type which interrogates a selected ground beacon or transponder to initiate a reply. The DME receives the reply from the beacon and gives the pilot a reading of the distance from the aircraft to the ground beacon. The DME automatically searches in range by means of a range gate, and then locks in to automatic track-in-range upon reception of the several reply pulses that are coincident in time with the range gate.

In the DME described herein, the range gate is driven by a stepper motor (a three-phase motor in this example) rather than by the usual servo motor. More specifically it is a stepper motor that drives a resolver from which resolved or delayed pulses are obtained to produce the range gate which is shifted in its timing as the resolver is rotated.

The stepper motor is rotated in one direction or the other by the output of a ring counter, the direction depending upon the direction or sequence of the ring counter operation. The ring counter is operated in one direction if pulses appear on one of two input leads; it is operated in the other direction if pulses appear on the other of the two input leads.

The direction of operation of the ring counter, and therefore, of the stepper motor, is controlled by a range error detector which supplies reply pulses to one ring counter input lead when the range gate is to be driven in the increase range direction (to maintain coincidence with reply pulses), and which supplies reply pulses to the other ring counter input lead when the range gate is to be driven in the decrease range direction. The stepper motor in the present example makes one rotational step of 15 degrees for each input pulse applied to the ring counter.

The DME comprising the stepper servo motor driven by a ring counter which is controlled by the error detector is described and claimed in application Ser. No. 480,465, filed on the same day as the present application in the names of Robert P. Crow and Dov Malkin, and entitled, "DME With Stepper Type Servo Motor."

The DME has four modes of operation which are (1) Track Mode, (2) Proportional Memory Mode, (3) Search Mode, and (4) Acquisition Mode.

In accordance with one feature of the invention, a radial ground speed indicator is provided which utilizes the pulses applied to the stepper motor for giving a reading of radial ground speed with respect to the ground station while the DME is in the track mode.

In accordance with another feature of the invention, a time-to-station indicator is provided which gives a reading of the time it will take the aircraft to arrive at the ground station being interrogated.

An object of the invention is to provide improved radial ground speed indicating apparatus for automatic track-in-range radar equipment such as DME.

A further object of the invention is to provide improved means for giving time-to-station as a function of ground speed and distance to station.

A still further object of the invention is to provide an improved time-to-station indicator for DME.

Before describing the ground speed and time-to-station indicators, the DME system in which they are employed, in the present example, will be described.

The operation of the DME in the Track Mode is as described in a general way above, the range gate being maintained in coincidence with the reply pulses. The Search Mode operation will now be described in a general way. Description of operation in the other modes will be given later. The DME goes into the search mode a short time after reply signals are lost, having first gone into the memory mode upon loss of reply signals. In the search mode a search rate generator is made to supply pulses to the "increase range" input lead of the ring counter. These pulses cause the stepper motor to be driven at a high speed so that the range gate is driven through the 200 nautical mile range of the DME in about five seconds. As soon as the range gate becomes coincident with reply pulses, the search rate generator is made inactive, and the DME goes out of search, goes into the acquisition mode for a fraction of a second, and then goes into the track mode.

In patent application Ser. No. 311,445 filed Sept. 25, 1963, in the names of Irving A. Sofen and Robert P. Crow, entitled DME With Fast Search, which issued April 12, 1966 as Patent 3,246,325, there is described DME that is provided with extremely fast search, the fast search being obtained by the use of gear shifting and a conventional servo motor. The presently described DME provides substantially the same fast search at a lower cost. In the specific example of the DME being described, as in the above-identified Sofen and Crow application, the search rate is 40 miles per second, and the tracking rate is anywhere from 0 to 2500 miles per hour (i.e. from 0.00 to 0.7 mile per second) depending upon the speed of the aircraft carrying the DME and the relative direction of the ground station. In this example, the DME can search through the entire operating range of 200 miles in five seconds.

The invention will be described in detail with reference to the accompanying drawing in which.

Figure 6:
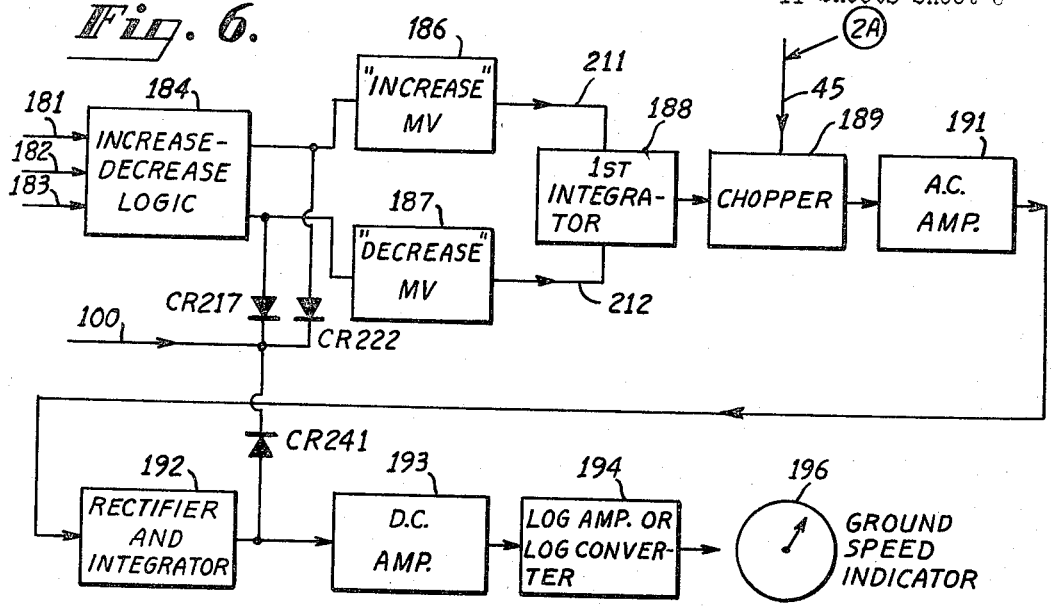
FIG. 6 is a block diagram of ground speed indicator apparatus constructed in accordance with one embodiment of the invention.
Figure 7:
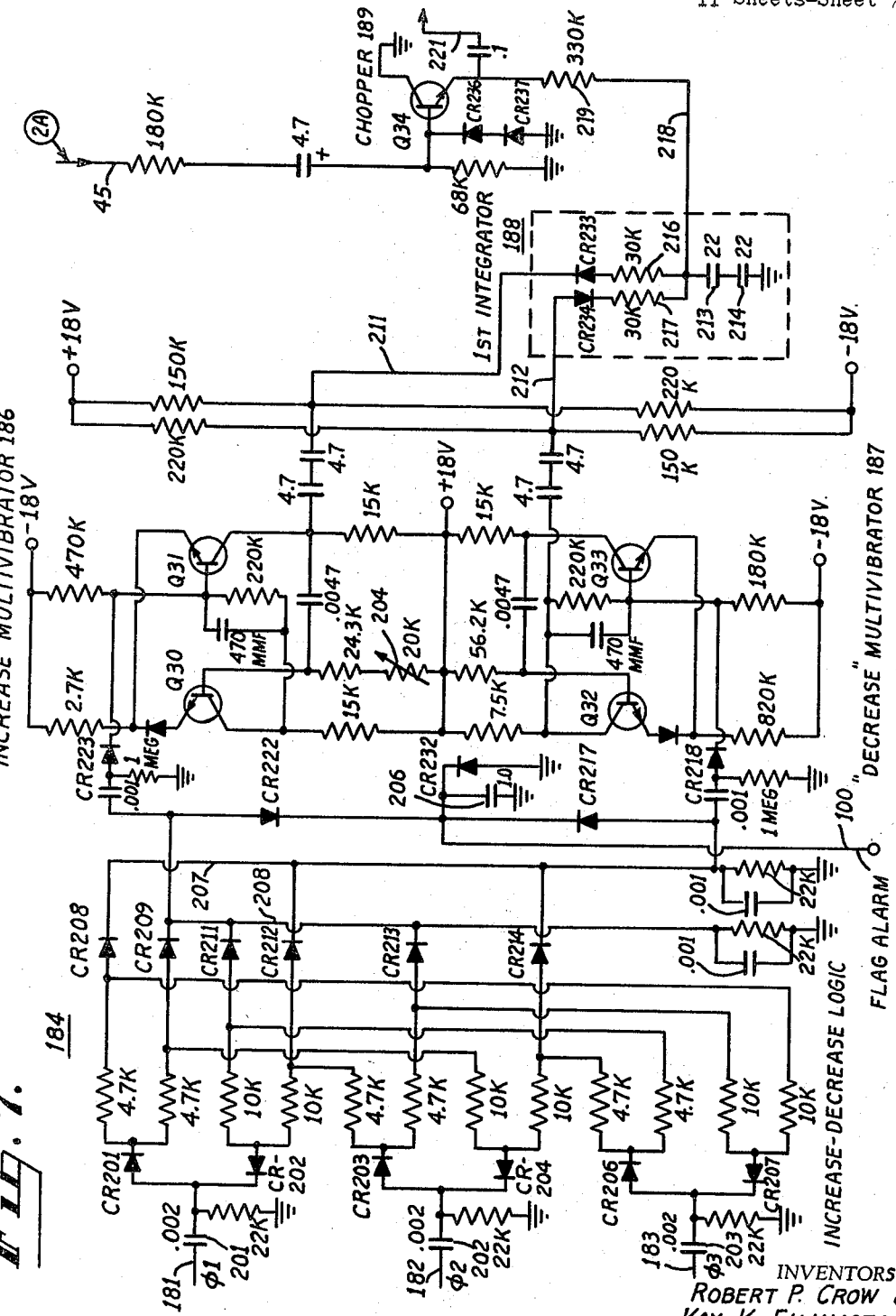
Figure 8:
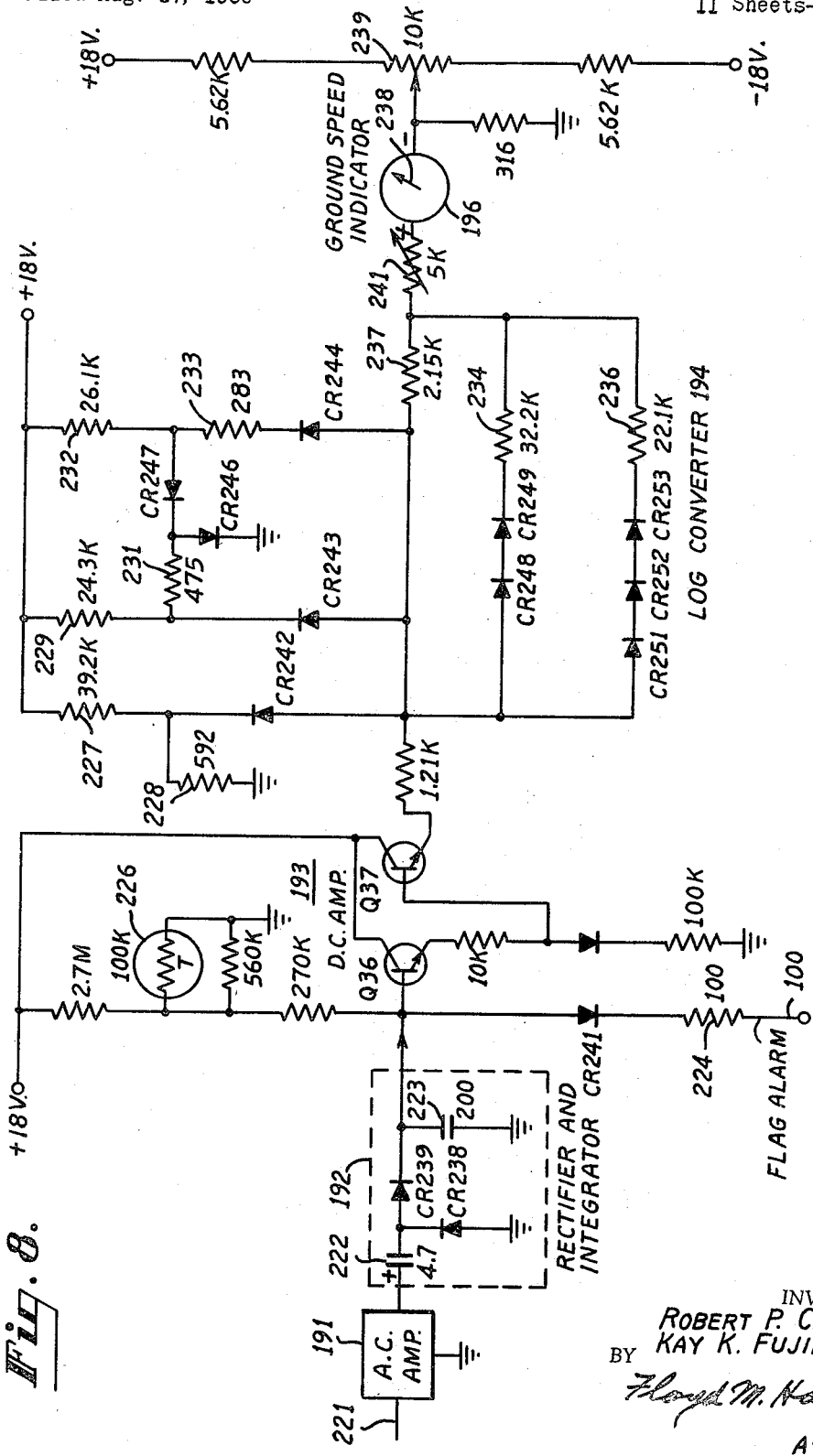
Figure 9:
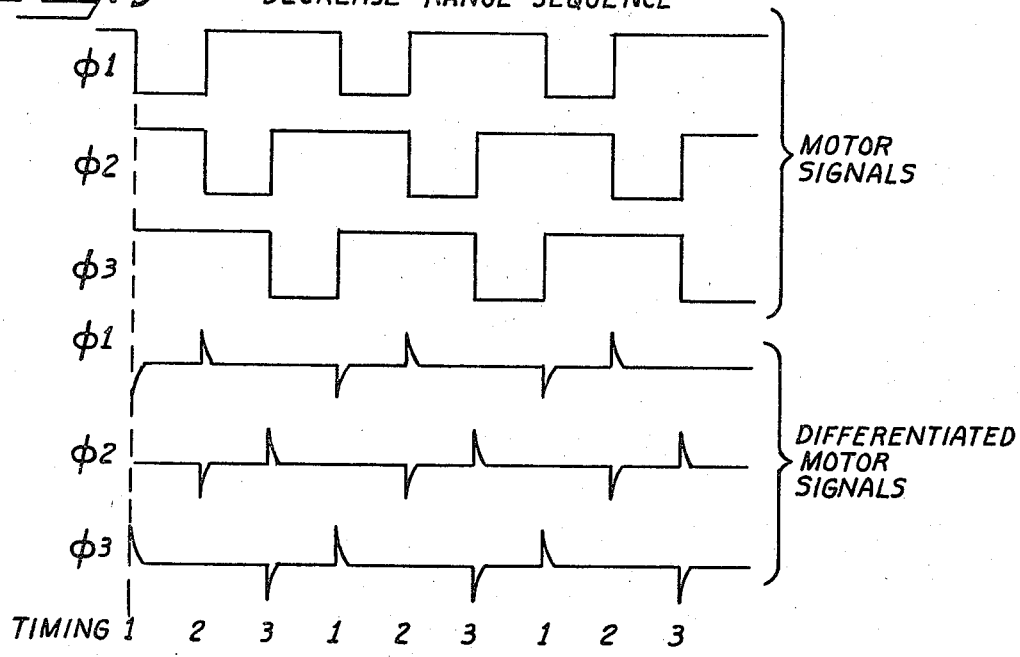
Figure 10:
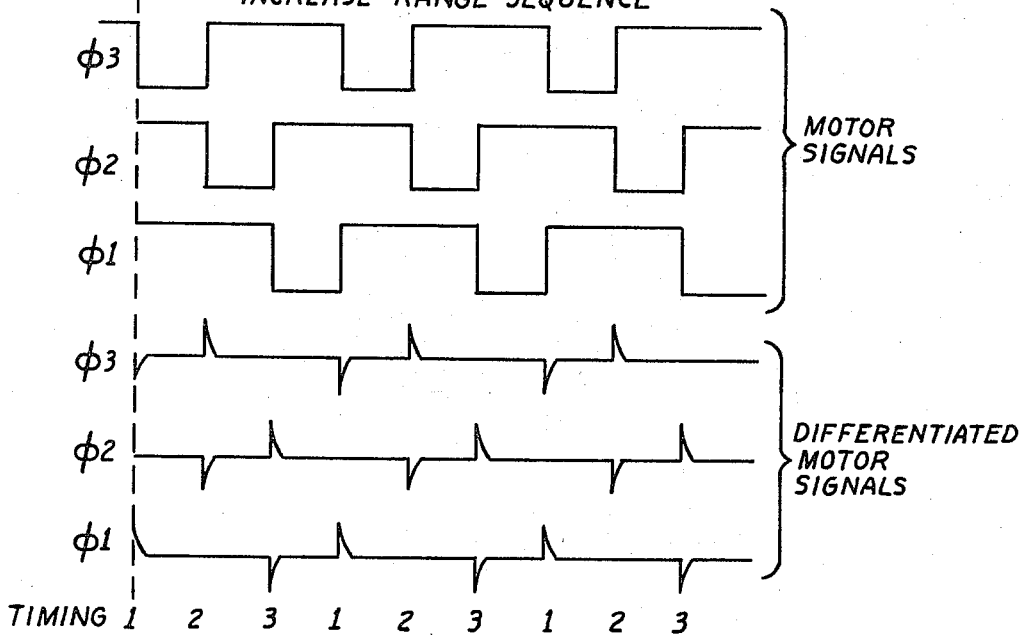
Figure 11:
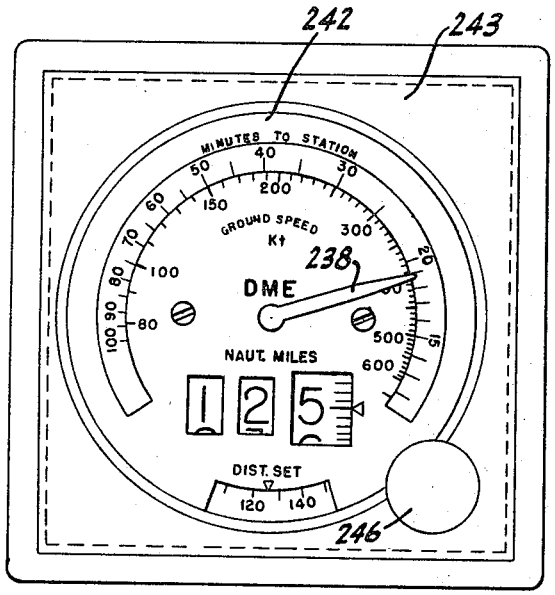
Figure 12:
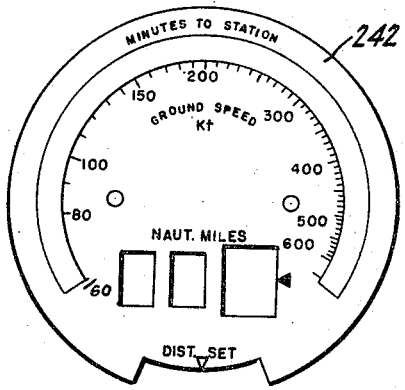
Figure 13:
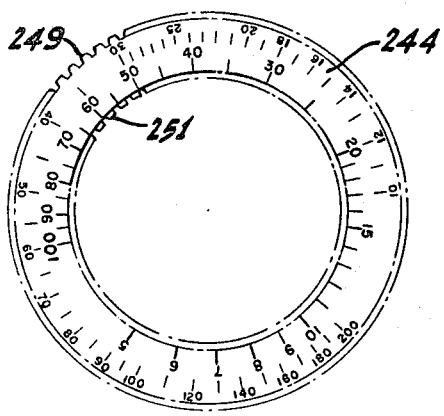
Figure 14:
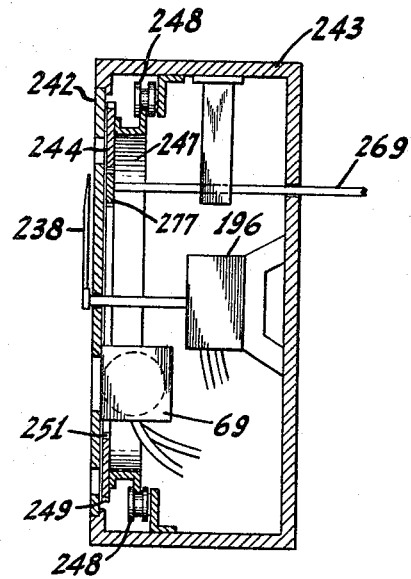

FIGS. 7 and 8, placed end to end, are a circuit and block diagram of the apparatus shown in FIG. 6;

FIGS. 9 and 10 are timing diagrams which are referred to in explaining the operation of the ground speed indicator shown in FIGS. 6, 7 and 8;

FIG. 11 is a front view of the display unit which shows distance to station, ground speed, and time to station;

FIGS. 12 and 13 are views of parts of the display unit of FIG. 11 which show the logarithmic scales and some of the structure;

FIG. 14 is a side view showing the supporting structure for the part shown in FIG. 13;

FIG. 15 is a schematic diagram illustrating another way of obtaining a ground speed indication for use with the display unit of FIG. 12;

FIG. 16 is a front view of a roller and cam plate arrangement for driving the logarithmic distance scale of the display unit automatically so that no manual setting is required; and FIG. 17 is a side view of the structure shown in FIG. 16.

In the several figures like parts are indicated by similar reference characters.

The DME which will now be described is referred to as DMET (Distance Measuring Equipment, Tacan). It has assigned to it 126 transmitting channels and 126 receiving channels which are frequency separated. No specific description of the apparatus providing the separate channels is required because it is known. However, it might be pointed out that a Tacan ground station broadcasts randomly occurring pairs of pulses known in the Tacan art as squitter pulses. One purpose of these squitter pulses, among others, is to provide an A.G.C. signal at the receiver of any interrogating craft which is independent of the number of craft which happen to be interrogating a particular ground station during the same time period.

Figure 1:
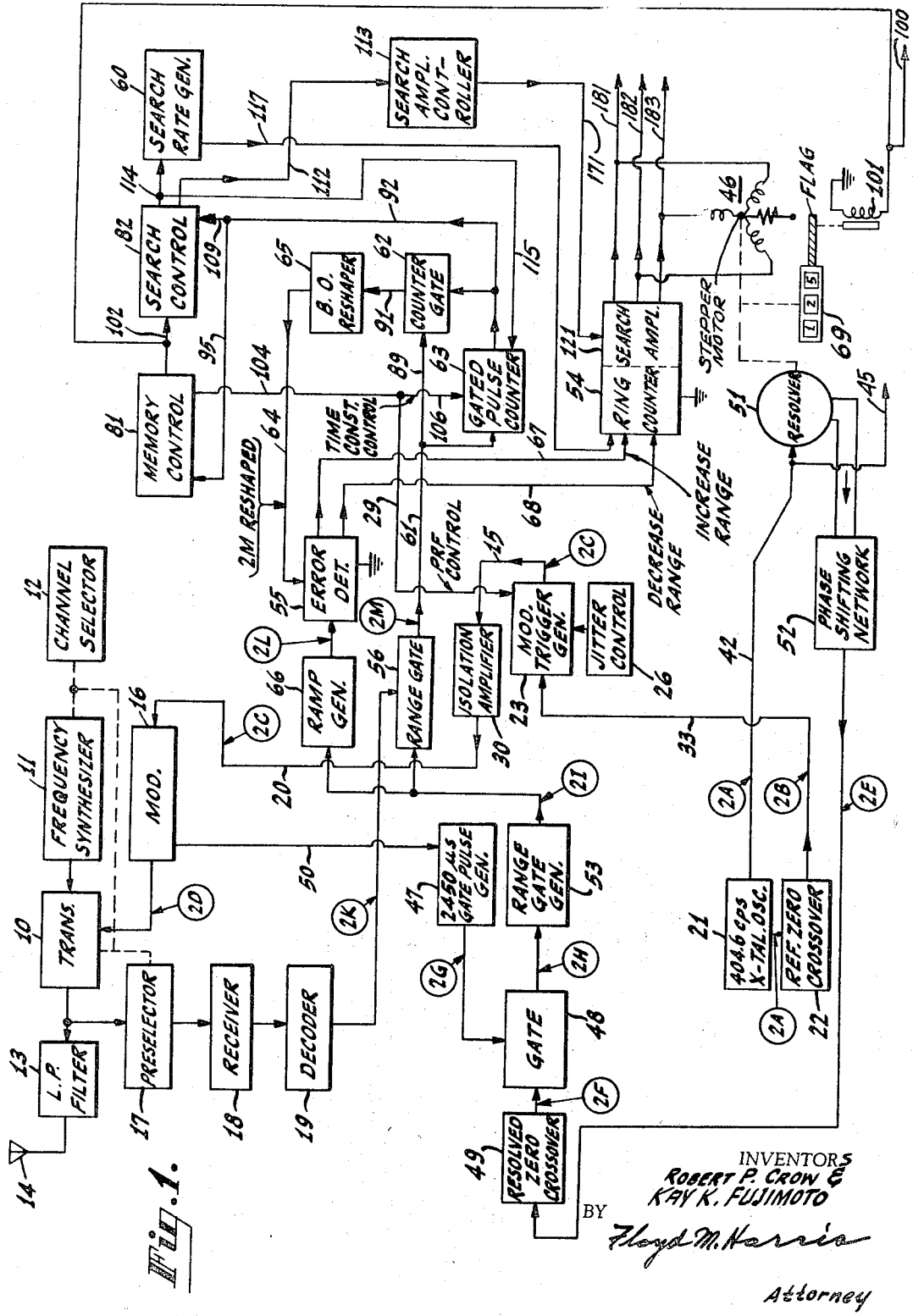
FIG. 1 is a block diagram of the DME in which the invention is employed, in the present example.

FIG. 1 is a block diagram of the DME. The DME comprises a radio transmitter 10 comprising amplifiers to which a selected carrier wave is supplied from a frequency synthesizer 11. The desired carrier wave is selected by a suitable channel selector 12. The transmitter is coupled through a low-pass filter 13 to an antenna 14 which functions as both a transmitting and a receiving antenna. The low-pass filter 13 prevents the transmission of harmonics of the transmitter frequency. It also prevents possible spurious receiver responses at frequencies, for example, where the preselector has additional pass bands. The transmitter is modulated by periodically recurring pairs of code-spaced pulses 2D (FIG. 2D) supplied from a modulator 16 for interrogating the selected ground beacon.

Reply pulses along with squitter pulses from the ground beacon are received by antenna 14 and passed through the filter 13 to a preselector 17 which is tuned to receive reply and squitter pulses on the transmitting channel of the selected ground station. As indicated by the dotted lines, when the transmitter 10 is tuned to interrogate the selected ground station, the preselector is simultaneously tuned to the transmitting frequency of that ground station. The reply signal is passed from preselector 17 to a radio receiver 18. The demodulated signal, shown in FIGURE 2J, appears at the output of receiver 18 as periodically recurring pairs of video reply pulses along with randomly occurring pairs of squitter pulses, there being a pair of reply pulses in response to each pair of interrogating pulses. The video pulses from receiver 18 are applied to a decoder 19 which decodes the pairs of pulses to produce a single pulse 2K (FIG. 2K) for each pair of applied pulses.

RANGE TIMING CIRCUIT

Reference is now made to the range timing circuit which comprises, in this example, a precise oscillator 21 (FIG. 1), such as a crystal controlled oscillator, operating at 404.6 cycles per second, and which supplies a sine wave signal 2A of constant amplitude as shown in FIG. 2A. The oscillator output is supplied to a zero crossover circuit 22 which produces one pulse at the positive going zero crossover for each applied sine wave cycle as shown in FIG. 2B. These are referred to as the reference trigger pulses 2B. The circuit 22 may be any one of several suitable types well known in the art. One such type comprises limiters for squaring the sine wave, a differentiator for producing a pulse of positive polarity at the start (zero crossover) of one half cycle of the square wave, and a blocking oscillator that is trigggered by this positive pulse.

The reference trigger pulses 2B are applied to a modulator trigger generator 23 which comprises a blocking oscillator that is triggered by the applied pulses to produce modulator trigger pulses 2C as shown in FIG. 2C. The modulator trigger pulses are passed over leads 15 and 20 to the modulator 16, preferably through an isolation amplifier 30. The modulator 16 includes a coding circuit for producing periodically recurring pairs of pulses, the pairs having the desired code spacing. The modulator 16 also includes a suitable pulse generator to produce the high peak powers required by the transmitter stages.

A jitter control circuit 26 applies a varying voltage to the blocking oscillator (FIG. 3) of generator 23 so that the modulator trigger pulses jitter. This jitter is a discrete amount as will be understood by referring to FIG. 2B and FIG. 2C where the modulator trigger pulse is illustrated for the case where the blocking oscillator has been triggered by the first reference trigger pulses of FIG. 2B, then triggered by the second pulse following the first pulse, next triggered by the fifth pulse following the first pulse. The jitter control may make the blocking oscillator fire on other reference trigger pulses such as the fourth and sixth pulses.

Figure 3:
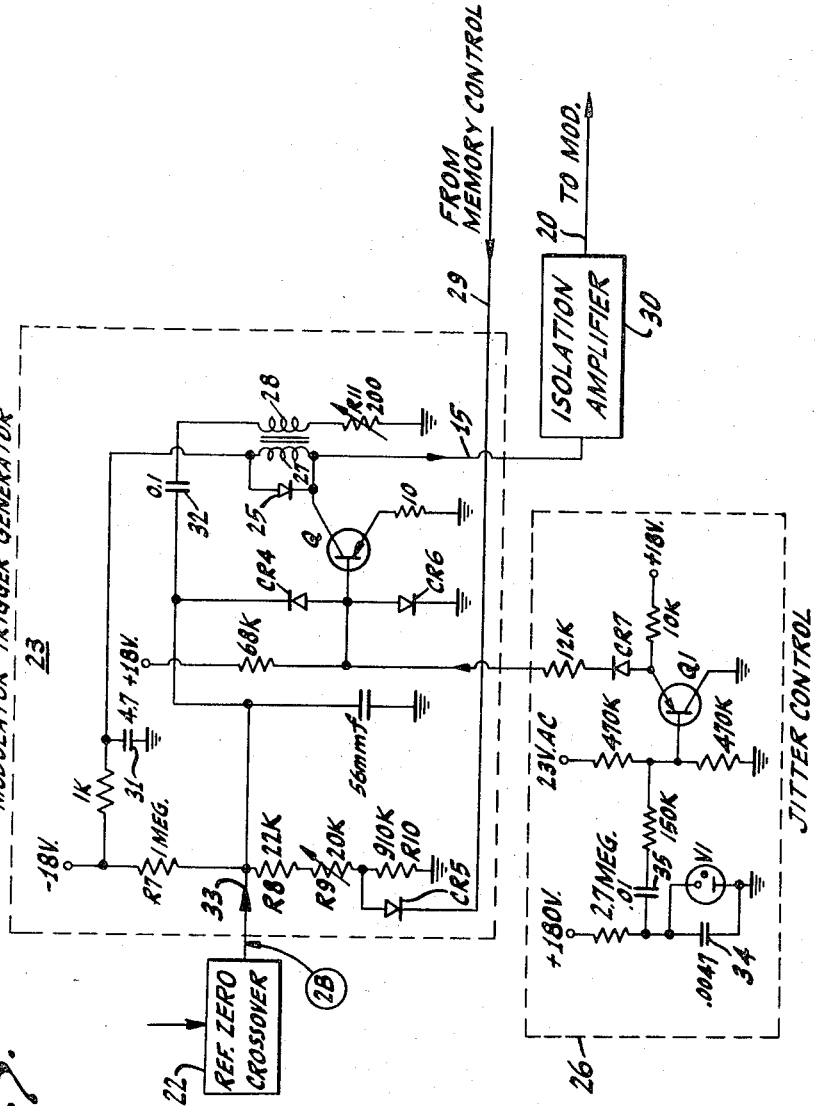
FIG. 3 is a schematic and block diagram of certain units shown in FIG. 1, including the modulator trigger generator.

Now refer to FIG. 3 for circuit details of units 23 and 26 given by way of example. The trigger generator 23 comprises a blocking oscillator which, in the example shown, comprises a transistor Q of the PNP type. The blocking oscillator transformer comprises a primary winding 27 in the collector circuit and a secondary winding 28 in the base circuit. Minus 18 volts is applied to the collector of transistor Q through a 1000 ohm resistor and primary winding 27. A filter capacitor 31 and a protective diode 25 are provided. Secondary winding 28 has one end connected through an adjustable resistor R11 to ground. The other end of secondary 28, which is driven negative when the oscillator fires, is connected through a capacitor 32 and a diode CR4 to the base of transistor Q. The emitter of transistor Q is connected to ground through a ten ohm resistor. When the blocking oscillator fires, current flows from emitter to base, through diode CR4, capacitor 32, and secondary 28 to ground. Thus, at the end of the pulse, capacitor 32 is charged and back biases diode CR4. The negative reference trigger pulses being applied over lead 33 cannot trigger the blocking oscillator until sufficient charge has leaked off capacitor 32 to sufficiently reduce the back-bias on diode CR4.

The leakage path for capacitor 32 is through resistors R7, R8, R9, R10 to ground, and from ground through resistor R11 and secondary 28. The leakage rate, after initial adjustment, is determined by whether resistor R10 is shorted or remains effectively in the circuit. When shorted, the average PRF is 140 pulses per second; when not shorted, the PRF is 27 pulses per second. The PRF is controlled by diode CR5 which is made conducting or non-conducting by the memory control as will be described later.

During the track and memory modes, diode CR5 is held non-conducting (so that R10 is not shorted) by plus 20 volts applied over lead 29 from the memory control. During the search and acquisition modes, diode CR5 conducts and shorts R10 due to lead 29 having been placed substantially at ground potential by the memory control. It should be noted that the top of R8 is held at a positive potential by the charge on capacitor 32 due to pulses from secondary 28 and the resulting current flow through diode CR4. The minus 18 volt supply is not effective to control the potential at the top of R8 because its connection thereto is through a one megohm resistor R7.

It may be noted that the blocking oscillator of trigger generator 23 is not free-running, i.e., it must be triggered since transistor Q is normally biased to cut-off by the voltage drop across a diode CR6 resulting from plus 18 volts connected to its anode through a 68K resistor.

The jitter control circuit 26 is a free-running relaxation oscillator comprising a capacitor 34 connected at one side through a 2.7 megohm resistor to 180 volts D.-C., and connected at the other side to ground. The capacitor is shunted by a neon lamp V1 which breaks down when capacitor 34 charges to a certain voltage. Thus, a sawtooth voltage having an average frequency of about 600 c.p.s. appears across capacitor 34. This sawtooth voltage is coupled by way of an emitter-follower transistor Q1 of the PNP type to the discharge path of blocking oscillator capacitor 32, thus superimposing a wave in the PRF control RC network that jitters the PRF output of the modulation trigger generator by a few counts. This jitter is a discrete amount as previously described.

The sawtooth voltage is applied to the blocking oscillator by way of Q1 as follows. The high voltage side of capacitor 34 is coupled through a capacitor 35 and a 150K resistor to the base of transistor Q1. The base of Q1 is also connected through a 470K resistor to ground, and through a second 470K resistor to a 23 volt A.-C. source which produces additional random jitter.

The collector of Q1 is connected directly to ground. The emitter is connected through a 10K resistor to plus 18 volts. The coupling from Q1 to the blocking oscillator is from the emitter through a diode CR7 and a 12K resistor to the base of transistor Q.

The modulator trigger pulses produced by trigger generator 23 are applied from the collector of transistor Q through leads 15 and 20 to the modulator 16, preferably through the isolation amplifier 30 which may be of the emitter-follower type.

TRACK AND SEARCH CIRCUITRY

Reference is now made more particularly to the automatic track-in-range and automatic search-in-range circuitry.

The resolved trigger pulses 2F (FIG. 2F), which control the timing of the range gate, are obtained as follows. The sine wave signal from timing oscillator 21 is supplied over a lead 42 to the rotor of a resolver 51 which is driven by the stepper range motor 46 through suitable gearing, not shown. The motor makes 15 degree steps, or 24 steps per revolution. It is geared down 400 to 1 to the resolver so that the resolver makes one revolution for 200 miles. Thus, 9600 steps of approximately 0.021 mile each are required for 200 miles. Two out-of-phase output signals are obtained from the resolver stator windings. These output signals are supplied to a phase shifting network 52 in which they are added to produce a single phase-shifted sine wave signal, shown in FIG. 2E, which is phase shifted by an amount that is a function of the position of the resolver rotor. This signal is referred to as the resolved timing signal 2E.

The timing signal 2E is fed to the zero crossover circuit 49 which may be the same as the zero crossover circuit 22. Thus, the output of unit 49 is the resolved trigger pulses 2F (FIG. 2F).

It is necessary to eliminate all resolved trigger pulses except the first one to follow an interrogation. Therefore, they are supplied to a coincidence circuit or gate 48 to which is also supplied a gate pulse, having a width of 2450 microseconds in the present example, from a gate pulse generator 47. This gate pulse is shown in FIG. 2G and is identified as pulse 2G. The resolved trigger pulse of the pulses 2F that is coincident with the gate pulse 2G is passed by the gate 48. This is the gated resolved pulse 2H shown in FIG. 2H. The gate 48 may be a coincidence circuit of any suitable type, such as a coincidence diode circuit. The gate pulse generator 47 may be, for example, a monostable multivibrator which is triggered on through a lead 50 by the leading edge of the first of the pair of interrogation pulses 2D, and which turns itself off at the end of 2450 μs. Or, such a multivibrator may be triggered on by the modulator trigger pulses 2C. It is evident that the pulse repetition frequency (PRF) of the output pulses 2H of gate 48 is the same as that of the modulator trigger pulses 2C.

For producing the range gate pulses 2I (FIG. 2I), the gated resolved pulses 2H are applied to a range gate generator 53 which may be a monostable multivibrator that is triggered by the applied pulses to produce a range gate pulse 2I. In the present example, the range gate pulse is 32 microseconds wide. It will now be evident that the time of occurrence of the range gate pulse 2I with respect to the modulator trigger pulse 2C is a function of the position of the resolver 51 as set by the range stepper motor 46.

The range stepper motor 46 is driven by pulses from a ring counter 54 which is under the control of pulses from an error detector 55 when the DME is in the acquisition and automatic track-in-range modes, and which is under the control of pulses from a search rate generator 60 when the DME is in automatic search.

Figure 2:
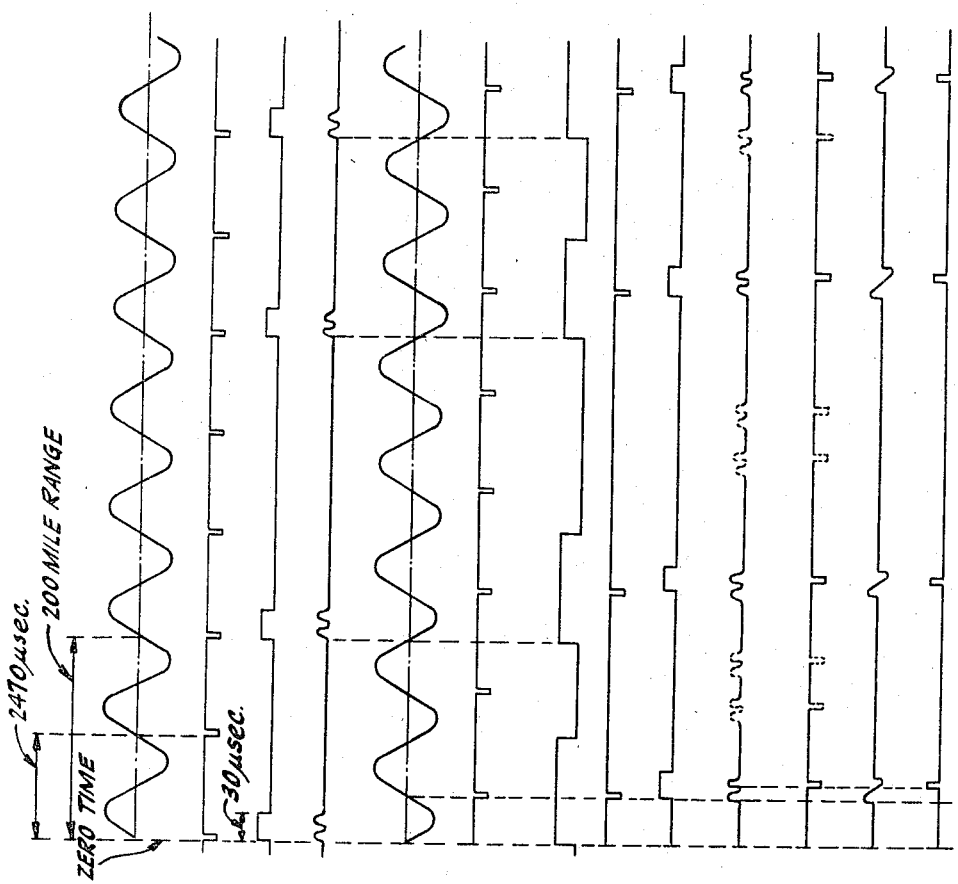
FIG. 2 is a range timing diagram for the apparatus of FIG. 1.

The controlling pulses from the error detector 55 are obtained as follows. The range gate pulses 2I are applied to a range gate or coincidence circuit 56 which may be of the type comprising diodes. Also, the decoded reply pulses 2K (FIG. 2K) are supplied from the decoder 19 to the range gate 56. When a decoded pulse 2K is in time coincidence with the range gate pulse 2I as illustrated in FIG. 2, the decoded reply pulse passes through the range gate 56 and is applied over a lead 61 to a counter gate 62 and also to a range gated pulse counter 63. The range gated reply pulses on lead 61 are identified as pulses 2M (FIG. 2M). As described hereinafter, if enough successive reply pulses are coincident with the range gate pulse, the voltage applied to the counter gate 62 by the gated pulse counter 63 will make the counter gate 62 pass the gated reply pulses 2M (FIG. 2M) and apply them to a blocking oscillator 65 which reshapes them. The reshaped pulses 2M are supplied over a lead 64 to the error detector 55.

Figure 4:
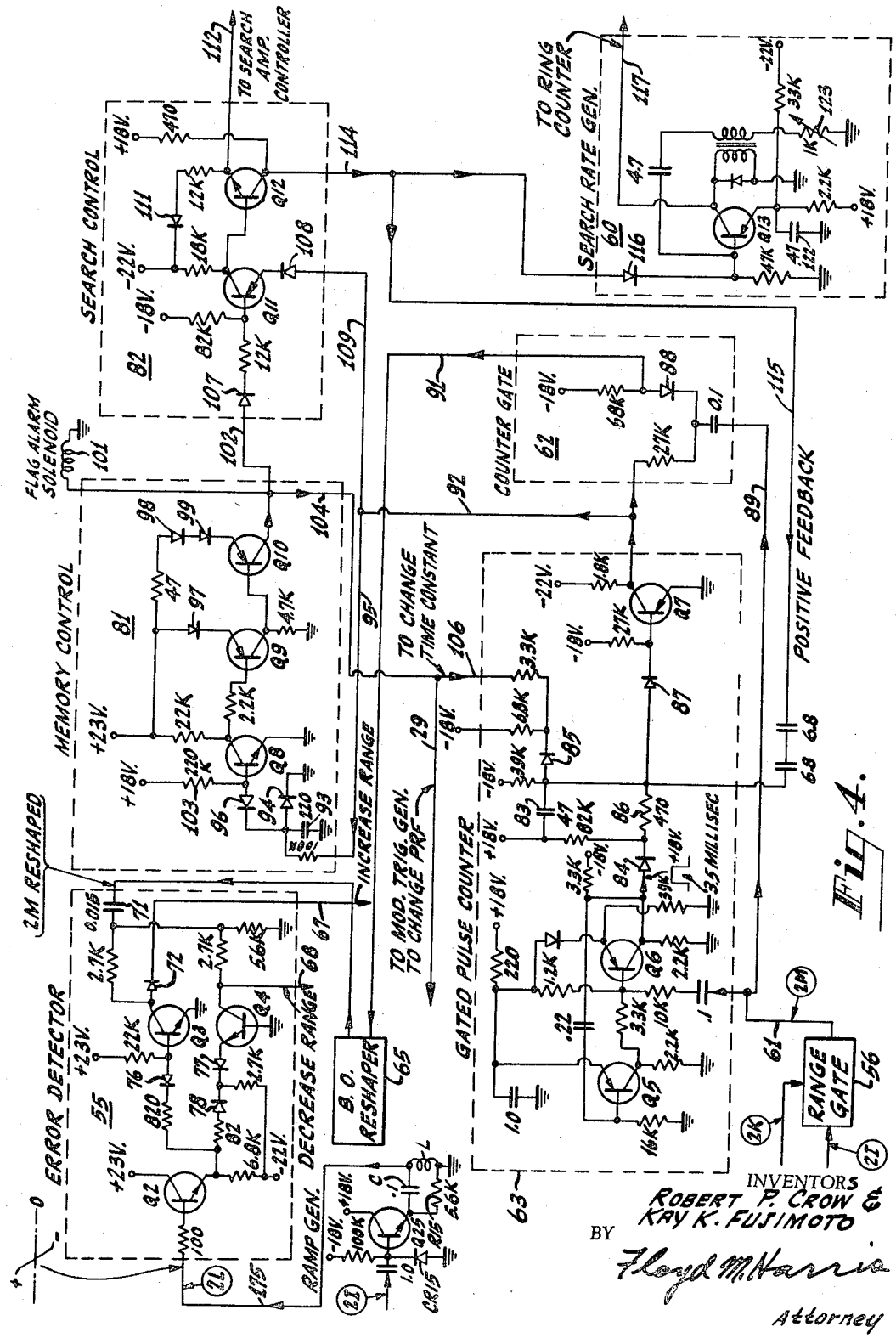
FIG. 4 is a schematic and block diagram of certain other units shown in FIG. 1, including the error detector, the ramp generator, the memory control, the search control, the gated pulse counter, and the search rate generator.

Ramp pulses 2L (FIG. 2L) are also applied to the error detector 55 from a ramp generator 66. The ramp pulses are produced in a known manner by the ramp generator upon the application thereto of the range gate pulses 2I. One example of such a ramp generator is described in the above-identified Sofen and Crow application. Another example of a ramp generator is illustrated in FIG. 4 and will be described hereinafter.

If the ramp pulse 2L is centered with respect to the gated reply pulse 2M, no pulses will appear on the error detector output leads 67 and 68, and the ring counter 54 and stepper motor 46 will not be driven (unless in the search mode as described hereinafter). If the gated reply pulses advance in time to where the ramp 2L is positive, the gated reply pulses appear on lead 68 and drive the stepper motor 46, by way of the ring counter 54, in the direction to move the range gate and the ramp in the decrease-range direction to center the ramp with respect to the reply pulse.

On the other hand, if the gated reply pulses retard in time to where the ramp 2L is negative, the gated reply pulses appear on lead 67 and drive the stepper motor 46, by way of ring counter 54, in the direction to move the range gate and the ramp in the increase-range direction to center the ramp with respect to the reply pulse. In the track mode, the stepper motor is always driven in the direction to center the ramp pulse with respect to the gated reply pulse. Thus, the range gate is held in time coincidence with the reply pulses so that range is shown by a range indicator, such as a digital indicator 69 or a range dial and pointer, that is coupled to the stepper motor through suitable gearing, not shown. In the present example, the motor is geared down 20 to 1 to the digital indicator shaft.

The circuit of the error detector 55 and of a suitable ramp generator and their operation will now be described with reference to FIG. 4. The ramp generator comprises a transistor Q25 of the NPN type which has in its emitter circuit a series resonant circuit consisting of a capacitor C and an inductance coil L. The resonant circuit is shunted by a resistor R15. Q25 is normally cut off by the forward voltage drop across a diode CR15. When the positive range gate pulse 2I occurs, it is coupled through a 1.0 mf. capacitor to the base of Q25, and Q25 conducts, passing a current through the circuit C, L. The voltage across L rises rapidly to a maximum of about plus 15 volts and then falls in a damped cosine wave during the range gate pulse. At the end of the range gate pulse, the voltage reaches its negative peak of about minus 10 volts. Q25 then cuts off and the energy in the resonant circuit is rapidly dissipated in resistor R15. The output of the ramp generator, therefore, is the ramp pulse 2L (FIG. 2L) which resembles one-half cycle of a cosine wave. The ramp pulse is applied over a lead 175 to the error detector 55.

The ramp pulse 2L is applied from the lead 175 through a 100 ohm resistor to the base of a transistor Q2 of the NPN type. The reshaped reply pulses 2M are applied through a capacitor 71 and through a 2.7K resistor to the collector of a transistor Q3 of the NPN type, and through another 2.7K resistor to the collector of a transistor Q4 of the NPN type. The ends of the 2.7K resistors remote from the collectors are connected through a 5.6K resistor to ground.

The collector of Q3 is connected through a diode 72 to an output lead 67 on which increase-range pulses will appear. The collector of Q4 is connected to an output lead 68 on which decrease-range pulses will appear.

Transistor Q2 functions as an emitter-follower. The emitter of Q2 is connected through an 820 ohm resistor and a diode 76 to the base of Q3, the anode of the diode being connected to said base. The base of Q3 is connected through a 22K resistor to plus 23 volts so that Q3 is forward biased if the emitter of Q2 is at zero potential. The emitter of Q3 is grounded.

The base of Q4 is grounded. The emitter of Q4 is connected through a diode 77 and a 2.7K resistor to minus 22 volts so that Q4 is forward biased if the emitter of Q2 is at zero potential. The emitter of Q2 is connected through an 82 ohm resistor and a diode 78 to the junction point of the diode 77 and the 2.7K resistor, the cathode of diode 78 being connected to the cathode of diode 77.

The operation of the error detector 55 is as follows. At the instant the ramp pulse is at zero potential the emitter of Q2 is at zero potential. At this time Q3 and Q4 are both forward biased so that their collectors present a low impedance to a reply pulse 2M if it is applied to the collectors at this time whereby said pulses are shorted to ground. Therefore, they cannot appear on either one of the output leads 67 and 68.

If the reply pulses 2M advance in time to where the ramp signal and the emitter of Q2 are positive, the forward bias on Q4 is overcome (diode 78 now conducting), and Q4 is back-biased. At the same time diode 76 is back-biased, preventing the emitter-base junction of Q3 from loading Q2, but Q3 remains forward-biased by the current through the 22K resistor. The reply pulses 2M appearing at this time see a high impedance at the collector of Q4 and appear on the output lead 68 as decrease-range pulses.

If the reply pulses 2M retard in time to where the ramp signal and the emitter of Q2 are negative, the opposite condition exists. Now the emitter base junction of Q3 is back-biased while that of Q4 remains forward-biased. The reply pulses 2M appearing at this time see a high impedance at the collector of Q3 and appear on the output lead 67 as increase-range pulses.

The purpose of diodes 76 and 78 is to provide isolation and prevent loading of the ramp voltage by the error detector, and to produce a narrow "dead zone" around the zero ramp voltage where reply pulses 2M are passed to neither one of the output leads 67 and 68. This prevents the range servo from hunting continuously when the range is not changing. It also reduces servo jitter when the range is changing. The two diodes accomplish this by requiring ramp voltages offset from zero for operation of their respective range error functions. For example, because of the forward voltage drop of diode 76 the ramp voltage at the output of Q2 must move approximately 0.6 volt more negative before Q3 is cut off and a reply pulse will produce an increase-range output. The purpose of diode 77 is to protect the emitter-base junction of Q4 from excessive reverse voltage from the ramp signal.

MODE SWITCHING

The switching of the DME from one mode of operation to another is under the control of the gated pulse counter 63, a memory control 81, and a search control 82, these units being shown in block in FIG. 1 and in circuit detail in FIG. 4. As previously stated, there are four modes of operation, namely, (1) automatic track, (2) proportional memory, (3) automatic search, and (4) acquistion.

The circuits for switching the DME into these different modes of operation will now be described, particularly with reference to FIG. 4. In FIG. 4 and also in FIGS. 3 and 5, and in certain following figures, some of the circuit values are given merely by way of example. Unless otherwise indicated, the values are in ohms, thousands of ohms ($k$), megohms (MEG), microfarads, and micro-microfarads (mmf.).

The gated pulse counter 63 includes a conventional monostable multivibrator comprising transistor Q5 and Q6 of the PNP type. Other multivibrator circuits than the specific one illustrated may be employed. Whenever it is triggered by a reply pulse 2M from the range gate 56 (or by a squitter pulse), it produces a 3.5 millisecond pulse of positive polarity of approximately 18 volts and of constant amplitude at the collector of Q6.

Since only the reply pulses 2M are synchronous with the interrogations, they alone pass through the range gate 56 in any appreciable number. By determining when the rate at which reply pulses pass through the range gate 56 reaches the expected value, the reply pulse can be detected. In the present example, if three or four consecutive pulses at the search PRF pass through the range gate 56, the DME will be switched out of the search mode as described hereinafter by the resulting three or four consecutive 3.5 millisecond pulses at the collector of Q6.

Continuing the circuit description of the gated pulse counter, each 3.5 millisecond pulse charges a capacitor 83 through a diode 84 and a resistor 86. The left hand side of capacitor 83 is connected to plus 18 volts. It is also connected through an 82K resistor to the junction point of diode 84 and resistor 86. The right hand side of capacitor 83 is connected through a 39K resistor to of minus 18 volts. It is also connected through a diode 85 (when it is conducting) and through a 6.8K resistor to minus 18 volts and through a 3.3K resistor and a lead 106 to the memory control 81 as described hereinafter. This "charging" of capacitor 83 is charging in the sense that it is making the right hand side of capacitor 83 less negative or more positive; it actually reduces the voltage across the capacitor. Similarly, "discharging" of capacitor 83 is discharging in the sense that it is making 55 are applied from the lead 67 to a bus 161. From bus 161 these pulses are applied through a diode 162 and a capacitor 163 to the base of Q14, through a diode 164 and a capacitor 166 to the base of Q15, and through a diode 167 and a capacitor 168 to the base of Q16.

The diode side of capacitor 163 (at the input of Q14) connects through a 10K resistor to the collector of Q15, the diode side of capacitor 154 connects through a 10K resistor to the collector of Q16. The diode side of capacitor 166 (at the input of Q15) connects through a 10K resistor to the collector of Q16, the diode side of capacitor 157 connects through a 10K resistor to the collector of Q14. The diode side of capacitor 168 (at the input of Q16) connects through a 10K resistor to the collector of Q14, the diode side of capacitor 159 connects through a 10K resistor to the collector of Q15.

The operation of the ring counter will now be described. In the normal condition with no input pulses applied, one of the transistors is on and the other two are off. Assume Q15 is on, i.e., conducting. It is conducting because of current flow through zener diode Z2 and through the base to emitter of Q15. Z2 is conducting because the lead 142 is at a positive voltage since the diodes 147 and 148 are cut off so that they cannot pull down the voltage on lead 142. Diodes 147 and 148 are cut off since Q14 and Q16 are cut off so that their collector leads 126 and 136, respectively, are at approximately plus 23 volts supplied through the windings of stepper motor 46.

Q14 and Q16 are held cut off because their zener diodes Z1 and Z3, respectively, are nonconducting so that there is no base to emitter current flow in Q14 and Q16. Z1 and Z3 are nonconducting because the diodes 144 and 151, respectively, are conducting and clamp leads 141 and 143, respectively, to the potential of the Q15 collector which is substantially ground potential since Q15 is conducting.

With Q15 conducting, the collectors of nonconducting transistors Q14 and Q16 are at plus 23 volts. Thus, the input capacitors 157 and 166 of Q15 are each charged by the collector voltage through a 10K resistor. Since the diode side of these capacitors is charged positive, the diodes 156 and 164 are back-biased so that input pulses cannot pass through them. Similarly, one of the input capacitors of Q14, the capacitor 154, is charged by way of its 10K resistor connection to the collector of Q16 so that diode 153 is back-biased. The input capacitor 163 is not charged because its 10K resistor connection is to the Q15 collector which is at substantially ground since Q15 is conducting. Similarly, one of the input capacitors of Q16, the capacitor 168, is charged by way of its 10K resistor connection to the collector of Q14 so that diode 167 is back-biased. The input capacitor 159 is not charged because its 10K resistor connection is to the Q15 collector which is at substantially ground potential.

From the foregoing it will be seen that only diode 162 at the input of Q14 is set up to pass increase-range pulses, and only diode 158 at the input of Q16 is set up to pass decrease-range pulses. All other input diodes are back-biased. A certain set-up time is required to back-bias these other diodes, the set-up time in the present example being about 0.2 millisecond. The set-up time is determined by the time constant of the charging circuit for the 0.015 microfarad input capacitor, the charging circuit being through a 10K resistor and a 3.9K resistor.

It will be apparent that if increase-range reply pulses are supplied over lead 67 from the error detector, they will pass through diode 162 and trigger Q14 on, the next increase-range pulse will trigger Q16 on, etc., the sequence being Q15, Q14, Q16. On the other hand, assume that the applied pulses were decrease-range pulses from the lead 68. They pass through the diode 158 and trigger Q16 on, the next decrease-range pulse will trigger Q14 on, etc., the sequence being Q15, Q16, Q14.

In prior DME's range error detector is employed in which its output is smoothed with a relatively long time constant RC integration network. Such an error detector is disclosed in the above identified Soften and Crow application. Acceleration and velocity errors result from this type of error detector. A DME using this type of error detector also is subject to errors resulting from large error random 12 microsecond early replies, which are common with present TACAN ground stations.

These errors are avoided or reduced in the DME here described. With the stepper motor servo system in track (or acquisition), the range gated reply pulses directly step the motor in one direction or the other, depending on their position with respect to the center of the ramp signal. A gated reply pulse arriving early (on the left, or positive side of the ramp) will cause the error detector 55 to produce a pulse on the decrease-range lead 68. This in turn causes the motor 46 to step, and the range indicator 69 to turn approximately 0.02 miles toward the ground station. A late reply pulse causes the opposite effect, producing a pulse on the increase-range lead 67. A dead zone equivalent to one or two steps exists in the center of the ramp.

Therefore, reply pulses arriving more than the equivalent of 0.02 mile from the ramp center will cause the servo motor to take but one step per pulse, regardless of how large the error may be for any given reply. Thus, random large error replies will have a minimum effect on the accuracy; and within the maximum tracking velocity limits, the servo system and range indicator will have no more than a one step error, aside from any jitter effects in the replies. Also, since there is no integration of the error detector output, the acceleration and velocity errors introduced in prior DMEs by their error detector integration are avoided.

Since during the automatic range track mode the reply pulses are recurring at a fixed frequency, at 27 pulses per second in the present example, and since one pulse causes the stepper motor to make one step, the question may arise as to how the stepper motor slows down, for example, when the aircraft carrying the DME slows down, so that the range gate pulse is held coincident with the reply pulses. The main answer to this is that when the range gate pulse and the ramp signal are driven too far in one direction, the stepper motor reverses. More specifically, the motor jitters, stepping first in one direction and then in the other to hold the range gate pulse and the ramp signal substantially centered with respect to the reply pulses.

Furthermore, the dead zone in the error detector reduces the amount of this motor jitter. Assume an instant when the ramp signal is centered with respect to the reply pulses so that, at the error detector, the reply pulses are in the dead zone so that no pulses are applied to the stepper motor. As the aircraft moves toward or away from the ground station being interrogated, the reply pulses move out or partly out of the dead zone so that the motor is stepped in the direction to pull the reply pulses back into the dead zone momentarily. At the slower aircraft speeds, some of the reply pulses remain in the dead zone so that they are not active to step the motor whereby the above-mentioned motor jitter is reduced.

It may be noted that in the present example, with the aircraft traveling at 600 knots toward or away from the ground station, the DME will be held in automatic track-in-range by driving the motor at eight steps per second. Thus, eight of the 27 reply pulses (occurring in one second) shifting out of the dead zone will cause the motor to make eight steps per second and hold the DME in track.

In the search mode it is the pulses over lead 117 that are applied to the ring counter. They are applied to the increase-range bus 161 and drive the ring counter in the sequence Q15, Q14, Q16 as previously described.

As the ring counter is driven during the track mode, in the increase-range sequence Q15, Q14, Q16 for example, current flows successively through the windings of the stepper motor 46. For example, when Q15 is on, current flows from plus 23 volts through windings 134, through lead 133, diode 132, the 75 ohm resistor, lead 131, and through transistor Q15 to ground and to the round terminal of the 23 volt source. The 75 ohm resistor reduces the current and motor dissipation in the track mode where full motor torque is not required for the low stepping rates. When Q14 is on, current flows through winding 129 and through a similar path to Q14, and through Q14 to ground. When Q16 is on, current flows through winding 139 and through a similar path to Q16 and through Q16 to ground.

The search amplifier 121 comes into operation when reply pulses have been lost and the DME has gone into the search mode. This amplifier comprises a Darlington pair of transistors Q17 and Q18 of the NPN type, a second similar Darlington pair Q19, Q20, and a third similar Darlington pair Q21, Q22.

The collectors of Q17, Q18 connect through lead 128 to motor winding 129, the collectors of Q19, Q20 connect through lead 133 to the motor winding 134, and the collectors of Q21, Q22 connect through lead 138 to motor winding 139.

The transistors Q17 and Q18 are protected against positive voltage overshoot transients from the motor winding 129 by a diode CR10 connected between the collectors and plus 23 volts. Likewise, transistors Q19 and Q20 are protected by a diode CR11, and transistors Q21 and Q22 are protected by a diode CR12. Since each of the diodes CR10, CR11 and CR12 is connected across a motor winding, these diodes also damp the stepper motor.

The emitters of Q18, Q20, and Q22 connect to a lead 171 going to the collector of a transistor Q23 of the NPN type which comprises the search amplifier controller 113. The emitter of Q23 connects through a diode 172 to minus 22 volts. When Q23 is made conducting, as described hereinafter, the emitters of Q18, Q20, and Q22 are connected to the minus 22 volts so that the Darlington pairs are turned on and are in amplifying condition. They are off when the DME is in the track mode.

The control pulses for the Darlington pairs come from the cathodes of the zener diodes Z1, Z2 and Z3 through the following circuits. The cathode of Z1 is connected through a lead 173, a 2.2 microfarad capacitor, and a 2.7K current limiting resistor to the base of Q17. Note that when the Darlington pair is in amplifying condition Q17 is normally back-biased as a result of minus 22 volts applying a negative voltage to the base through a 4.7K resistor. Note that at this time the emitter of Q18 is at slightly less than minus 22 volts because of the slight voltage drop across the transistor Q23 and the diode 172. The input connections for Q19 and Q21 are similar to the one for Q17, the cathode of Z2 being connected through a lead 174, a 2.2 mf. capacitor, and a 2.7K resistor to the base of Q19; and the cathode of Z3 being connected through a lead 176, a 2.2 mf. capacitor, and a 2.7K resistor to the base of Q21.

In the search mode the Darlington pairs are made effective to supply the desired power to the stepper motor for fast search. They are put in amplifying condition by Q23 of the search amplifier controller being turned on by the search control 82, as described later. When turned on, and with the search rate generator also turned on, the operation is as follows. Assume an input pulse has turned on Q15 of the ring counter. The cathode of zener diode Z2 rises to plus 13 volts from a potential near ground. It had been near ground potential because Q16 previously was on with its collector near ground, and with diode 147 conducting to clamp the cathode of Z2 near ground. This voltage step of 13 volts is coupled through lead 174 and the 2.2 mf. capacitor to the base of Q19, causing Q19 and Q20 to conduct. Thus, a pulse of current flows through the motor winding 134. On the next pulse from the search range generator, Q14 is turned on, and the cathode of Z1 rises to plus 13 volts, applying a pulse to the base of Q17. Thus, the pair Q17, Q18 are made conducting and a pulse of current flows through motor winding 129. On the next pulse Q16 turns on, the pair Q21, Q22 conduct, and a pulse of current flows through motor winding 139. The operation then repeats.

Refer now to the control of the search amplifier controller 113 by the search control 82. As previously described with reference to FIG. 4, when the DME is in the track mode, Q12 of the search control 82 is off. Its emitter is then negative enough so that, by way of lead 112, a diode 177 in the search amplifier controller 113 (FIG. 5) is cut off so that there is no forward bias on Q23 and it is cut off. Therefore, as previously described, the Darlington pairs cannot operate.

When the DME goes into the search mode, Q12 of search control 82 (FIG. 4) becomes conducting, and its emitter goes to about minus 5 volts. Diode 177 of the search amplifier controller 113 (FIG. 5) now conducts and Q23 is forward-biased whereby the Darlington pairs of the search amplifier 121 are put in operating condition.

The sequence of operation of the DME through its four modes of operation will now be summarized.

*(I) Track mode*

A sufficient number of successive reply pulses have passed through the range gate 56 so that Q7 of the gated pulse counter 63 is biased off, cutting off Q8 in memory control 81 and turning on Q10 in memory control 81 so that its collector is at plus 20 volts.

The PRF is low since diode CR5 in the modulator trigger generator 23 is held back-biased by the plus 20 volts on the collector of Q10.

The time constant of the discharge circuit of counter store capacitor 83 is long, since diode 85 is back-biased by the plus 20 volts from the collector of Q10.

The stepper motor 46 is being driven by the output of error detector 55 through the ring counter 54 to hold the range gate pulse coincident with the reply pulses.

Meanwhile memory capacitor 93 in memory control 81 is being charged negative. It charges to a maximum in about 10 seconds.

*(II) Proportional memory mode*

Upon loss of reply signals, counter store capacitor 83 in the gated pulse counter loses its charge and it swings negative to make Q7 conduct.

The collector of Q7 is now near ground potential and memory capacitor 93 of memory control 81 is discharging, and the DME is in the memory mode.

The PRF is still low, as in track, since Q10 of the memory control is still on.

The time constant of the discharge circuit of counter store capacitor 83 is still long, as in track.

There being no reply signals, and random squitter pulses being blocked by counter gate 62, the ring counter and stepper motor are no longer driven; the range gate pulse holds in its last position, this being position memory. With a memory of about 10 seconds and at maximum aircraft speed, the range gate is not moved enough so that reply pulses fail to be coincident with range gate pulse if they return in 10 seconds or so.

Memory is a maximum of about 10 seconds. It is less if the DME is in track less than 10 seconds, in which case memory capacitor 93 of the memory control receives less charge and therefore is discharged to the search level quicker.

*(III) Search mode*

In ten seconds or less memory capacitor 93 of memory control 81 discharges enough to put a positive voltage on the base of Q8 to make it conduct. Q9 of the memory control turns on; Q10 of the memory control turns off, and its collector is substantially at ground potential since the right hand side of capacitor 83 more negative; it actually increases the voltage across the capacitor. The right hand side of capacitor 83 is connected through a diode 87 to the base of a transistor Q7 of the PNP type. Q7 is normally conducting, that is, it is conducting when no pulses, or an insufficient number of pulses, are being applied to the gated pulse counter from the range gate 56. At that time the right hand side of capacitor 83 is negative, and diode 87 is non-conducting.

Three or four successive pulses from the range gate 56 and the resulting positive 18 volt 3.5 millisecond pulses cause a "charge" of capacitor 83 and bring the right hand side of capacitor 83 to a positive potential whereby diode 87 conducts and transistor Q7 is cut off.

When Q7 is cut off, its collector is at approximately minus 20 volts. This voltage is applied through a 27K resistor to the cathode of a counter-gate diode 88. Since the anode of diode 88 is connected through a 68K resistor to minus 18 volts, the diode 88 conducts so that the reply pulses 2M from the lead 89 pass through the diode to the lead 91 and on to the blocking oscillator reshaper 65.

The voltage on the collector of Q7 is also applied by way of a lead 92 to both the memory control 81 and the search control 82.

Refer now to the memory control 81. It comprises a memory capacitor 93 which has one side grounded and which has the other side connected by way of a 100K resistor, a lead 95, and the lead 92 to the collector of Q7 in the gated pulse counter. If no reply pulses 2M are passing through the range gate (as in search), Q7 is conducting, its collector is at approximately ground potential, and memory capacitor 93 is in its "uncharged" condition. In this "uncharged" condition the ungrounded side of capacitor 93 is very slightly positive, this slight positive charge being limited by a diode 94 and also by the emitter-base junction of a transistor Q8.

The upper side of capacitor 93 is coupled through a diode 96 to the base of Q8 which is of the NPN type. The collector of Q8 is coupled through a 2.2K resistor to the base of a transistor Q9 of the PNP type. The collector of Q9 is connected through a 4.7K resistor to ground, and is coupled to the base of a transistor Q10 of the PNP type. Plus 23 volts is applied through a 22K resistor to the collector of Q8, through a diode 97 to the emitter of Q9, and through diodes 98 and 99 in series to the emitter of Q10 for proper biasing.

The collector of Q10 is connected through a flag alarm solenoid 101 to ground. It is also connected by a lead 102 to the search control 82.

Assume that there are no gated reply pulses 2M (as in search) so that Q7 is conducting and memory capacitor 93 is discharged. Then Q8 is biased into conduction by current through resistor 103. In this condition Q9 is also turned on and Q10 is cut off. Then the potential at the collector of Q10 is near zero, the flag alarm solenoid 101 is de-energized, and the flap covers the range indicator numerals.

Also, the modulator trigger generator 23 operates at the high PRF of 140 pulses per second because the collector of Q10 (at near zero potential) is connected by a lead 104 and the lead 29 to the cathode of CR5 (FIG. 3) making it conduct and short resistor R10.

Also, in the gated pulse counter the discharge circuit for capacitor 83 has the shorter time constant. The time constant is controlled by the connection of the collector of Q10 over the lead 104 and a lead 106 to the 3.3K resistor. Since the collector of K10 is near zero potential in the case assumed, diode 85 is not back-biased and is conducting to include the 6.8K and 3.3K resistors in the discharge circuit.

When three or four successive reply pulses 2M pass through the range gate and are applied to the gated pulse counter, Q7 cuts off and its collector goes to about minus 20 volts. Memory capacitor 93 now begins to charge by way of the leads 92 and 95 and the 100K resistor. In about 0.40 second the capacitor 93 has charged negatively enough to cut off Q8, cutting off Q9, and turning on Q10. The collector of Q10 is now at approximately plus 18 volts.

This 0.40 second period before Q8 is cut off is the acquisition period during which the PRF is still at the high rate of 140 pulses per second, and the time constant of the discharge circuit for counter capacitor 83 still is short. Reply pulses from the error detector 55 are driving the stepper motor by way of the ring counter.

The memory capacitor 93 continues to charge so long as Q7 remains cut off until it reaches its maximum charge in about ten seconds.

The search control 82 comprises a transistor Q11 of the PNP type and a transistor Q12 of the NPN type. The collector of memory control transistor Q10 is connected through the lead 102, a diode 107, and a 12K resistor to the base of Q11. A minus 18 volt source is connected through an 82K resistor to the base of Q11. A minus 22 volt source is connected to the collector of Q11 through an 18K resistor. The emitter of Q11 is connected to the cathode of a diode 108, and through this diode and a lead 109 and the lead 92 to the collector of Q7 in the counter.

Q12 has its base connected to the collector of Q11. Its emitter is connected through a 1.2K resistor and a diode 111 to minus 22 volts. Its collector is connected through a 470 ohm resistor to plus 18 volts. A lead 112 from the emitter goes to a search amplifier controller 113 (FIGS. 1 and 5) as described hereinafter. A lead 114 goes to the search rate generator 60, this lead going to the anode of a diode 116, and through the diode to the base of a transistor Q13 of the PNP type forming part of a blocking oscillator. There is also a feedback connection from the collector of Q12 by way of lead 114 and a lead 115 and through the two 6.8 mf. capacitors to the base of Q7 so that the positive pulse formed as Q12 cuts off is coupled to the base of Q7 as a positive feedback to speed up the transition process.

The operation of the search control will now be described. Assume that an insufficient number of successive range-gated reply pulses 2M are being applied to the gated pulse counter (as in search) so that Q7 is conducting and its collector is at approximately ground potential. Now Q10 in memory control 81 is nonconducting, its collector is at ground potential, so that Q11 is conducting since it is forward-biased by the minus 18 volt source, and since the diode 108 in the emitter circuit is conducting. Q12 now also is conducting, and its emitter and collector are both at approximately minus 5 volts. With the collector at minus 5 volts, the diode 116 in the search rate generator 60 is back-biased so that the search rate generator is allowed to oscillate. Its output is supplied over a lead 117 to the ring counter for driving the stepper motor 46 at a high speed for fast search as described hereinafter.

Next assume that three or four reply pulses pass through the range gate to cut off Q7 in the gated pulse counter putting its collector at minus 20 volts. This immediately, by way of leads 92 and 109, back-biases diode 108 in the search control so that Q11 and Q12 cut off. The collector of Q12 goes positive, the diode 116 is forward-biased, the base of Q13 swings positive, cutting it off, and the search rate generator 60 stops oscillating. Thus, during the acquisition period of 0.40 second following cut off of Q7, the only pulses supplied to the ring counter are those from the error detector. Since during this acquisition period memory capacitor 93 has not charged enough to cut off Q8, Q10 is still off with its collector at ground, the PRF remains high as in search, and the time constant of the discharge path for counter capacitor 83 remains short.

As soon as the charge on memory capacitor 93 reaches a value to cut off Q8, Q10 is made conducting, and its collector goes to plus 18 volts so that diode CR5 in the modulator trigger generator is back-biased by way of leads 104 and 29 to reduce the PRF to 27 pulses per second. This plus 18 volts by way of leads 104 and 106 also back-biases diode 85 in the counter so that the time constant of the counter capacitor discharge path is made longer to conform with the lower PRF. The DME is now in the track mode.

The memory control prevents the DME from going into search immediately upon loss of reply pulses. When reply signals are lost, Q7 of the gated pulse counter becomes conducting and its collector goes to ground potential. Memory capacitor 93 now begins to discharge through the 100K resistor, the leads 95 and 92, and through Q7 to ground. There is also a discharge through diode 96 and resistor 103 through the plus 18 volt source. The latter discharge may also be viewed as charging of capacitor 93 in the positive direction. Until capacitor 93 discharges sufficiently to turn on Q8 of the memory control, and thus turn on Q12 of the search control thereby turning on the search rate generator, the memory control holds the DME in the track condition with the search rate generator held non-oscillating.

Since there are no reply pulses, the ring counter and the stepper motor 46 are no longer driven, and the range gate pulse holds in its last position, this being position memory. With a memory of about 10 seconds, and at maximum aircraft speed, the range gate is not moved enough so that reply pulses fail to be coincident with the range gate pulse if they return in 10 seconds or so.

Memory is a maximum of about 10 seconds. It is less if the DME is in track less than ten seconds, in which case the memory capacitor 93 receives less charge, and therefore is discharged to the search initiating level quicker. This is proportional memory, the length of time the DME is held in the memory mode being proportional to the time the DME is in the track mode, up to about 10 seconds when maximum memory is provided.

RANGE SERVO SYSTEM

Figure 5:
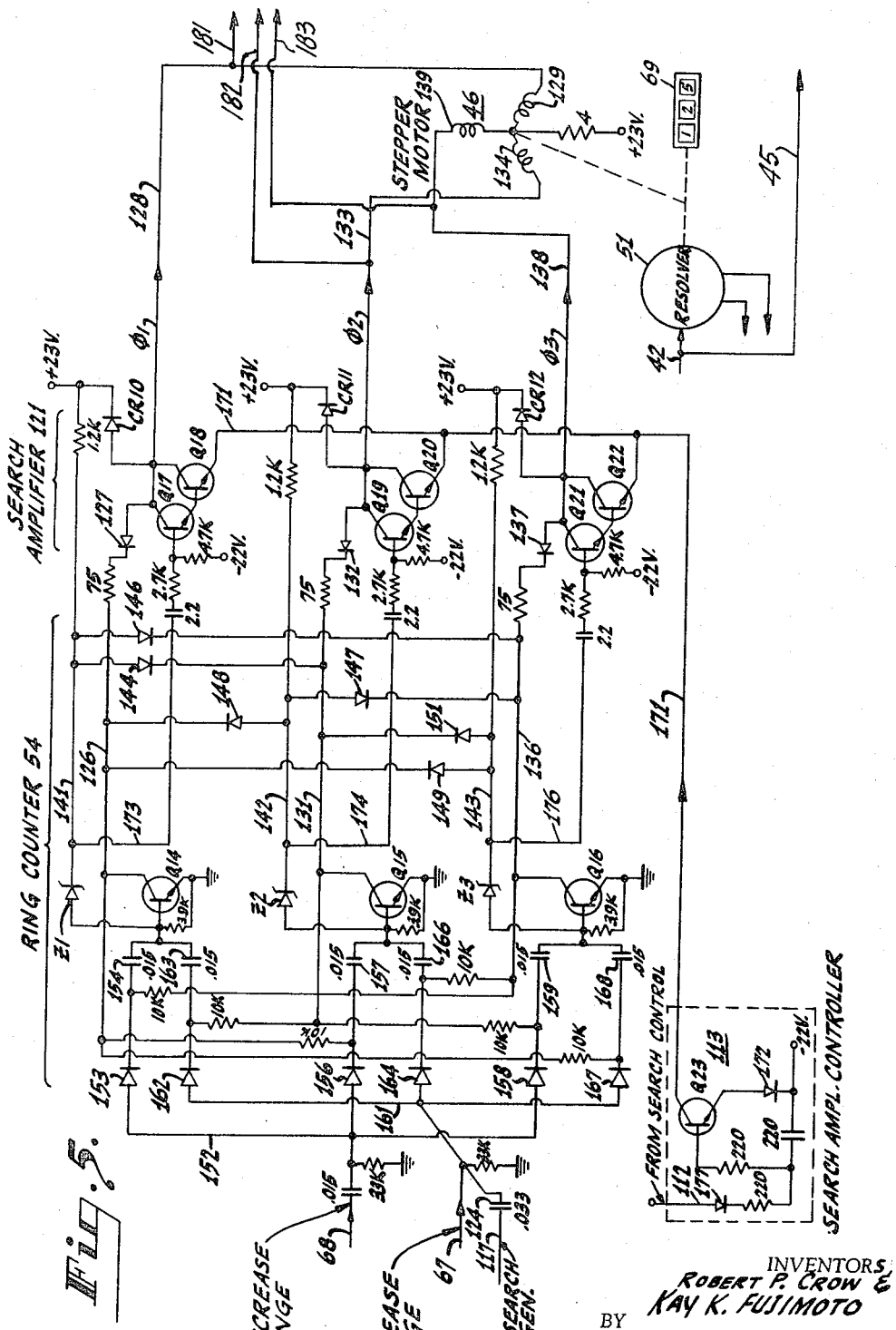
FIG. 5 is a schematic diagram of certain other units shown in FIG. 1, including the ring counter, the search amplifier and the stepper motor.

The range servo system drives the stepper range motor 46 which turns the phase-shifting resolver 51 and the range indicator 69 (FIGS. 1 and 5). This system includes the ring counter 54 which is a three-stage counter that generates a three-phase square-wave signal to drive the three-phase stepper motor 46. The ring counter is designed to run in either direction and drive the motor 46 in either direction depending upon whether trigger pulses are applied to the decrease-range lead 68 or to the increase-range lead 67. Thus, when tracking, the reply pulses from the error detector 55 increase or decrease range to hold the DME in automatic range track. In the present example the motor 46 is a variable reluctance three-phase motor Model 011–006–3 manufactured by IMC Magnetics Corp. It should be understood that the invention is not limited to the use of this particular type of stepper motor. There are other suitable stepper motors that may be employed.

In the search mode, the search-rate generator 60 (FIG. 4) supplies pulses to the ring counter 54 by way of lead 117 and a capacitor 124 (FIG. 5) to the increase-range input terminal to drive the stepper motor 46 at high speed for fast search. In search, resolver 51 is driven continuously in the direction to move the range gate 21 in the increase-range direction, i.e., its time of occurrence with respect to the transmitter interrogation increases. After the range gate 21 has swept through to the end of the 200 mile range, it again proceeds to sweep through the 200 mile range in the increasing direction. In the example illustrated in FIG. 5, the ring counter signal is amplified during search by a search amplifier 121 to supply added power to the stepper motor during search. The use of the search amplifier 121 makes it possible to design the ring counter with less power handling capability.

The use of the search amplifier as described herein and its use with a ring counter as described herein are described and claimed in application Ser. No. 480,357 filed on the same day as the present application in the names of Robert P. Crow and Michel Masse, and entitled Controller for Step Servo Motor.

Referring now in more detail to the search-rate generator 60 (FIG. 4), it is a blocking oscillator that is designed to start oscillating at from 250 to 450 pulses per second when diode 116 is back-biased and to rapidly increase in frequency to about 2200 pulses per second. This increase in pulse rate is obtained as follows. Initially the forward base-emitter bias of Q13 is high, and the resulting high-amplitude blocking oscillations require a relatively long time to recover, resulting in the lower frequency pulses. After each blocking oscillation, some charge is left on capacitor 122. This charge builds up exponentially. As it builds up, the oscillation amplitude decreases somewhat, and the oscillator frequency increases to its maximum of about 2200 pulses per second. It takes about 100 milliseconds for the oscillator to reach this maximum rate. The maximum rate may be set by adjusting the value of resistor 123.

The frequency of the search-rate generator 60 is made to increase in this way because the stepper motor 46 would not start if the high frequency pulses were applied to it when it was stationary. However, it will be started by the lower frequency pulse rate and will pick up speed as the pulses increase in frequency until the motor is "slewing," i.e., acting like a synchronous motor rather than stepping.

The ring counter, shown in FIG. 5, comprises transistors Q14, Q15, and Q16, each of the NPN type. The emitters of these transistors are grounded. The collector of Q14 is connected to plus 23 volts through a lead 126, a 75 ohm resistor, a diode 127, a lead 128, winding 129 of stepper motor 46, and a 4 ohm resistor to the positive 23 volt terminal. The collector of Q15 is similarly connected to plus 23 volts, this connection being through lead 131, a diode 132, lead 133, and through winding 134 of the stepper motor. The collector of Q16 is similarly connected to plus 23 volts, this connection being through lead 136, a diode 137, lead 138, and through winding 139 of the stepper motor.

The base of Q14 is connected to the anode of a zener diode Z1, and through Z1, a lead 141 and a 1.2K resistor to plus 23 volts. The bases of Q15 and Q16 are similarly connected through zener diodes Z2 and Z3, respectively, and leads 142 and 143, respectively, to plus 23 volts. If there is current flow through a zener diode, its associated transistor will be conducting because zener diode current also flows from the base to the emitter of the transistor.

The lead 141 from Z1 is connected through a diode 144 to the collector of Q15 by way of lead 131; it is also connected through a diode 146 to the collector of Q16 by way of lead 136. Thus, if Q15 and Q16 are cut off, their collectors are as plus 23 volts and back-bias diodes 144 and 146 whereby the voltage on lead 141 is not pulled down by these diodes. As a result, Z1 conducts and holds Q14 turned on.

The lead 142 from Z2 is connected through a diode 147 to the collector of Q16 by way of lead 136; it is also connected through a diode 148 to the collector of Q14 by way of lead 126.

The lead 143 from Z3 is connected through a diode 149 to the collector of Q14 by way of lead 126; it is also connected through a diode 151 to the collector of Q15 by way of lead 131.

The decrease-range reply pulses from error detector 55 are applied from the lead 68 through a 0.015 microfarad capacitor to a bus 152. From bus 152 these pulses are applied through a diode 153 and a capacitor 154 to the base of Q14, through a diode 156 and a capacitor 157 to the base of Q15, and through a diode 158 and a capacitor 159 to the base of Q16.

The increase-range reply pulses from error detector it is connected to ground through the flag alarm solenoid 101.

In the search control 82, Q11 turns on since Q7 of the gated pulse counter is now on (with its collector near ground potential) so that Q11 is forward biased by minus 18 volts through the 82K resistor, Q11, and the diode 108.

Q12 also turns on since the collector of Q11 and, therefore, the base of Q12 are near ground potential so that said base is positive with respect to the negative emitter. The emitter and collector of Q12 go to about minus 5 volts.

The minus 5 volts on the collector of Q12 back-biases the diode 116 in the search rate generator, and it oscillates to drive the ring counter and the stepper motor in search. The DME is now in the search mode. Any random ground station squitter pulses which are coincident with the range gate are blocked from the error detector and servo system by the counter gate 62.

The search amplifier 121 has also been put into operation because the minus 5 volts now on lead 112 removes the back bias from diode 177 in the search amplifier controller 113 and forward biases Q23, its emitter being at minus 22 volts.

The PRF is high since diode CR5 in the modulator trigger generator is conducting. CR5 is conducting because memory control transistor Q10 is now off and its collector is at ground potential, thus putting the leads 104 and 29 at ground potential.

The discharge time constant of counter store capacitor 83 is fast since the diode 85 is conducting. Diode 85 is conducting because leads 106 and 104 from the collector of Q10 are essentially at ground potential, and the junction of the 3.3K and 6.8K resistors (and the cathode of diode 85) are more negative than the anode of diode 85 during search because of random ground station squitter pulses passing through the range gate 56. In the particular circuit illustrated, the diode 85 would be cut off by a volt or two during search in the absence of squitter pulses, but squitter pulses are always present in sufficient numbers to charge capacitor 83 enough to hold the diode 85 conducting.

When reply pulses return and three or four successive reply pulses pass through the range gate 56, the DME goes into the acquisition mode.

*(IV) Acquisition mode*

Upon return of reply pulses, when three or four successive reply pulses pass through the range gate 56, Q7 cuts off and its collector goes to minus 20 volts. This minus 20 volts cuts off diode 108 in the search control 82, cutting off Q11 and Q12. The collector of Q12 goes to plus 18 volts, this makes diode 116 conduct and stops the search rate generator 60. The counter gate 62 is opened by the minus 20 volts on the cathode of diode 88 and passes reply pulses to the error detector 55.

Thus, in acquisition mode, the ring counter and the stepper motor are driven by either increase-range or decrease-range pulses from the error detector 55, not by the search rate generator.

During search, memory capacitor 93 of the memory control 81 was in the uncharged state. As soon as Q7 cut off (putting the DME into acquisition, the negative voltage on its collector began to charge capacitor 93. When capacitor 93 charges sufficiently it cuts off Q8 of the memory control. This takes about 0.40 second and is the acquisition period.

During the acquisition period, the PRF and the discharge time constant of the counter store capacitor 83 are still high and fast, respectively, (as in search) since Q10 is still in its off (search) condition for this 0.40 second period.

At the end of this 0.40 second period, Q8 is cut off and the DME is thrown into the track mode by the following sequence:

Q9 cuts off and Q10 turns on. The collector of Q10 goes to plus 20 volts. This plus 20 volts through diode 107 holds Q11 and Q12 of the search control off during track, and also during the memory period. With Q12 held off, the search rate generator is held off during the track and memory modes.

Also, when Q10 turns on, the plus 20 volts at its collector back-diodes CR5 in the modulator trigger generator to decrease the PRF, and back-biases diode 85 in the gated pulse counter to increase the discharge time constant of capacitor 83.

Thus the DME is now back in the track mode.

GROUND SPEED SYSTEM

The ground speed determining system of the present invention will now be described. In a DME with a stepper type of servo motor as here described, each motor step represents an exact distance interval, approximately 0.02 nautical mile in the present example. Thus, a count of the input pulses to the motor for a time period, forward or backward, will give the exact distance change. If the motor rotated constantly in one direction as the range increased or decreased, it would only be necessary to measure the number of motor driving pulses per second in order to obtain a signal proportional to speed. However, the motor does not rotate in only one direction when holding the DME in track-in-range but, instead, it jitters, as previously described, because the range-error signals fluctuate between "increase" and "decrease," although one sense predominates over the other as the aircraft moves toward or away from the ground station. It is, therefore, necessary to measure the difference between the number of "increase" pulses per second and the number of "decrease" pulses per second in order to obtain a true measure of speed. This is the function of the blocks in FIG. 6 labeled "increase-decrease logic," "increase multivibrator," "decrease multivibrator," and "first integrator."

Refer to FIGS. 1, 6, 7 and 8. The motor driving pulses are applied through conductors 181, 182 and 183 to the increase-decrease logic circuit 184. As will be described later, the logic circuit 184 determines in which sense the three-phase error signals are applied to the servo stepper motor. Each time the signals step in the increase direction, a pulse is sent to the increase multivibrator 186. Each time the signals step in the decrease direction, a pulse is sent to the decrease multivibrator 187. The two multivibrators supply constant-energy pulses of opposite polarity to the first integrator 188. The output of the integrator 188 is, therefore, a D.-C. voltage with a magnitude proportional to the difference between the number of "increase" and "decrease" pulses per second, i.e., it is proportional to the speed. The polarity of this D.-C. voltage depends upon whether the range is increasing or decreasing.

The output of the first integrator 188 is transformed into an A.-C. signal by a chopper 189 which interrupts the D.-C. signal, in the present example, at the 404.6 c.p.s. rate of the reference timing signal 2A. The A.-C. signal from the chopper is then amplified by an A.-C. amplifier 191 and then rectified and smoothed in a second integrator by a unit 192. In the process of rectificatoin, the polarity or direction sense of the speed signal is eliminated, with the result that only the magnitude of the speed is displayed.

After being smoothed in the second integrator, the positive-polarity D.-C. output of the rectifier is further amplified by a D.-C. amplifier 193 and applied, in the present example, to a logarithmic amplifier or logarithmic converter 194 to obtain an output current proportional to the logarithm of the input voltage. The unit 194 may be a log converter of the type comprising diodes that are biased to progressively shunt the output of the D.-C. amplifier. The unit 194, instead, may be a log amplifier that amplifies direct current, in which case the D.-C. amplifier 193 may be eliminated, if desired. The output current of unit 194 is displayed as speed on a D.-C. meter

196. Because the indicated output is logarithmic, a circular slide-rule arrangement may be used for calculating time-to-station directly on the face of an indicator display (see FIG. 11) as described hereinafter.

Details of one example of the increase-decrease logic circuit 184 are shown in FIG. 7. The inputs to this circuit are applied over leads 181, 182 and 183, and are the same three-phase square-wave signals that are applied to the stepper motor. The three signals are applied to capacitors 201, 202 and 203, respectively, which, in conjunction with the associated 22K resistors, differentiate the signals and produce short pulses. FIG. 9 shows the motor signals and the differentiated pulses appearing across the 22K resistors when the range is decreasing. FIG. 10 shows the same signals when the range is increasing. Note that it is the negative going part of the motor signals that is the three-phase signal driving the motor. Timing numbers at the bottom of each diagram indicate the repeating sequence of events.

Continuing the circuit description, the phase one ($\varphi 1$) differentiated pulses appearing at capacitor 201 are applied to a diode CR201 which connects through a 4.7K resistor to a diode CR208, which connects to a "decrease" range bus 207. Both diodes are connected in the direction to pass positive polarity pulses. The bus connects to a 22K load or output resistor. The diode CR201 also connects through a 4.7K resistor to a diode CR209 which connects to an "increase" range bus 208. Diode CR209 is connected in the direction to pass positive pulses. The bus 208 connects to a 22K load or output resistor.

The pulses appearing at capacitor 201 are also applied to a diode CR202 which connects through a 10K resistor to a diode CR211 which connects to the "increase" range bus 208. Diode CR202 is connected in the direction to pass negative pulses; diode CR211 is connected in the direction to pass positive pulses. Diode CR202 also connects through a 10K resistor to a diode CR212 which connects to the "decrease" range bus 207. Diode CR212 is connected in the direction to pass positive pulses.

The $\varphi 2$ differentiated pulses are applied to diodes CR203 and CR204 connected to conduct positive and negative pulses, respectively. CR203 connects through a 4.7K resistor to the input side of CR212, and connects through a 4.7K resistor and a positive pulse passing diode CR213 to the "increase" range bus 208. CR204 connects through a 10K resistor to the input side of CR209, and through a 10K resistor and a positive pulse passing diode CR214 to the "decrease" range bus 207.

The $\varphi 3$ differentiated pulses are applied to diodes CR206 and CR207 connected to conduct positive and negative pulses, respectively. CR206 connects through a 4.7K resistor to the input side of CR214, and connects through a 4.7K resistor to the input side of CR211. CR207 connects through a 10K resistor to the input side of CR213, and through a 10K resistor to the input side of CR208.

Pulses appearing on the "increase" range bus 208 are applied through an RC coupling circuit and a diode CR223 to the increase-range multivibrator 186 to trigger it. Pulses appearing on the "decrease" range bus 207 are applied through an RC coupling circuit and a diode CR 218 to the decrease-range multivibrator 187 to trigger it.

The increase-decrease logic circuit 184 operates as follows. Referring to FIG. 9, first consider the conditions at time 1 (indicated at bottom of FIG. 9). A positive pulse appears at the $\varphi 3$ input and a negative pulse appears at the $\varphi 1$ input. No pulse appears at the $\varphi 2$ input. The negative $\varphi 1$ pulse cannot pass CR201. It passes CR202, but is prevented from going further by CR211 and CR212. The positive $\varphi 3$ pulse cannot pass CR207, but is conducted via CR206 and CR214 to the decrease-range bus 207 and to the decrease-range multivibrator 187. It is not passed through CR211 to the increase-range bus 208 because it is cancelled by the negative $\varphi 1$ pulse passed through CR202.

Next, consider the conditions at time 2. The positive $\varphi 1$ pulse cannot pass CR202, but is conducted via CR201 and CR208 to the bus 207 and to the decrease-range multivibrator 187. It is not passed through CR209 to the bus 208 because it is cancelled by the negative $\varphi 2$ pulse passed through CR204. The negative $\varphi 2$ pulse cannot pass CR203. It passes CR204, but is prevented from going further by CR 209 and CR214.

Finally, consider the conditions at time 3. The positive $\varphi 2$ pulse cannot pass CR204. It is passed via CR203 and CR212 to the decrease-range bus 207 and to the decrease-range multivibrator 187. It is not passed through CR213 to the increase-range bus 208 because it is cancelled by the negative $\varphi 3$ pulse passed through CR207. The negative $\varphi 3$ pulse cannot pass CR206. It is passed by CR207, but is prevented from going further by CR208 and CR213.

From the foregoing it can be seen that the phase sequence 1, 2, 3 results in a positive pulse being applied to the decrease-range multivibrator 187 for each pulse applied in this sequence to the motor for driving it in the decrease-range direction.

If the sequence of events illustrated in FIG. 10 is followed through the decrease-increase logic, it will be found that the phase sequence 3, 2, 1 (the increase-range sequence) results in a positive pulse being applied to the increase-range bus 208 and to the increase-range multivibrator 186 for each pulse applied in this sequence to the motor for driving it in the increase-range direction. Following through the logic for time 1 (FIG. 10), for example, a positive pulse appears at the $\varphi 1$ input and a negative pulse appears at the $\varphi 3$ input. No pulse appears at the $\varphi 2$ input. The negative $\varphi 3$ pulse cannot pass CR206. It passes CR207, but is prevented from going further by CR208 and CR213. The positive $\varphi 1$ pulse cannot pass CR202, but is conducted via CR201 and CR209 to the increase-range bus 208 and to the increase-range multivibrator 186. It is not passed through CR208 to the decrease range bus 207 because it is cancelled by the negative $\varphi 3$ pulse passed through CR207.

The logic for times 2 and 3 may be similarly followed through. It will be found that the phase sequence 3, 2, 1 for range increase results in the positive differentiated pulses being applied to the bus 208 and to the increase-range multivibrator 186.

The multivibrators 187 and 186 are shown in circuit detail in FIG. 7, but the circuit need not be described because the multivibrators are conventional emitter-coupled one-shot or monostable multivibrators comprised of transistors Q30 and Q31 and Q32 and Q33, respectively. To prevent false speed indications during search, the flag-alarm circuit is used to disable these multivibrators during search as next described, and also to discharge the second integrator as described later. Diodes CR222 and CR217 are connected to short-circuit the positive logic-output pulses to ground through a capacitor 206 when the diodes are made conducting. A lead 100 from the flag-alarm line (see FIGS. 1 and 4) applies the flag-alarm voltage to the cathodes of the diodes CR222 and CR217. During search, the flag-alarm voltage is zero and the positive output pulses of the logic circuit are shorted to ground, whereby the multivibrators are not triggered. During track, the flag-alarm voltage of approximately plus 18 volts back-biases the diodes CR222 and CR217, and the logic-output pulses trigger the multivibrators. When triggered, the multivibrators 186 and 187 each produce a constant-amplitude pulse approximately 190 microseconds long. The pulse length of the increase-range multivibrator is adjusted by means of a variable resistor 204 to equalize the energy content of the pulses produced by the two multivibrators. Because the amplitude of the "increase" pulse is somewhat greater than that of the "decrease" pulse, it has a shorter duration. A negative pulse is coupled to the first integrator 188 from the collector of transistor Q31 of the increase-range multivibrator over a lead 211. A positive pulse is coupled to the first integrator from the collector of Q32 of the decrease-range multivibrator over a lead 212.

In the first integrator 188, the negative pulses from the increase-range multivibrator 186 and the positive pulses from the decrease-range multivibrator 187 are passed by diodes CR233 and CR234, respectively, and charge the series combination of capacitors 213 and 214 oppositely through resistors 216 and 217. For normal differences between the negative and positive pulse rates, the charge on the capacitors reaches only a small percentage of the total pulse amplitude. Therefore, the D.C. voltage across the capacitors 213 and 214 is proportional to the difference in the pulse rates and is proportional to ground speed. When range is decreasing, the pulses from the decrease-range multivibrator predominate, and the D.-C. voltage is positive. When range is increasing, the pulses from the increase-range multivibrator predominate, and the D.-C. voltage is negative. At a speed of 550 knots the charge is approximately plus or minus 0.5 volt.

The D.-C. voltage of the first integrator is chopped by a chopper 189 which comprises a transistor Q34 of the NPN type. The D.-C. voltage is applied to the emitter of Q34 by way of a lead 218 and a resistor 219. The base of Q34 is driven by the 404.6 c.p.s. reference voltage appearing across the rotor of the resolver (see FIG. 1) and supplied over a lead 45. The base-emitter junction is driven in and out of conduction at the 404.6 c.p.s. rate. The forward voltage drop across diodes CR236 and CR237 connected between the base of Q34 and ground is greater than the most negative excursion of the first integrator output. Then, no matter whether the first integrator output is negative or positive, it is substantially grounded through Q34 during the time that Q34 is conducting. In this way the first integrator output is converted into a square-wave 404.6 c.p.s signal with an amplitude proportional to the first integrator output.

The square-wave output of the chopper is supplied over a lead 221 to the A.-C. amplifier 191 which amplifies it to a maximum level of approximately eleven volts peak-to-peak at the input of the rectifier and second integrator unit 192. The A.-C. amplifier is designed to have a high input impedance so that it does not load the chopper.

The rectifier and second integrator unit 192 is a voltage-double rectifier comprising diodes CR238 and CR239, and capacitors 222 and 223. The load placed on this rectifier by the following D.-C. amplifier 193 is very light so that the capacitors 222 and 223 charge almost to the peak-to-peak value of the spare-wave output from the A.-C. amplifier 191. The discharge circuit for the capacitors 222 and 223 has a long time constant which smooths the fluctuations of speed voltage which appear as modulation on the A.-C. amplifier output.

The output of unit 192 is amplified by a conventional D.-C. amplifier 193 comprising transistors Q36 and Q37 which are cascaded emitter followers. They present a high input impedance to the second integrator and a low output impedance to the circuits which follow. The base of Q36 is returned through a diode CR241 and a resistor 224 to the flag-alarm line (see FIGS. 1 and 4) by way of a lead 100. During search a low impedance to ground exists through the flag solenoid 101 (FIGS. 1 and 4). This discharges the second integrator quickly and returns the speed indication to zero when the DME goes into search. In the track mode the flag voltage of approximately plus 18 volts back-biases CR241 so that the second integrator output is unaffected. A thermistor 226 is provided to compenate for variations of collector cut-off current under conditions of temperature that could cause the D.-C. output to drift.

In the example illustrated, the output of the D.-C. amplifier is supplied to a log converter 194 which produces an output current proportional to the logarithm of its voltage input. The magnitude of this current is displaced on the D.-C. meter 196 as the ground speed.

The log converter is of a known type. It comprises three biased-diode circuits that progressively shunt the output of the D.-C. amplifier. These biased diodes are CR242, CR 243 and CR244. The bias circuits are resistors 227 and 228 for CR242; resistors 229 and 231 and diode CR246 for CR 243; and resistor 232 and diodes CR247 and CR246 for CR244. Resistor 233 limits the loading introduced by CR244.

A brief description of the operation of the log inverter is as follows: Only a portion of the total emitter current from transistor Q37 flows through meter 196. The remainder of the emitter current of transistor Q37 flows through one or more of the three shunt paths defined by biased diodes CR242, CR243, and CR244 respectively, which progressively shunt meter 196 in accordance with the magnitude of the input signal to the D.-C. amplifier. Thus, as this input signal becomes larger in magnitude, and hence the total output current from Q37 becomes larger in value, the proportion of this total output current which flows through meter 196 becomes smaller. In particular, the non-linear forward dynamic impedance characteristics of the various diodes of log converter 194 and the values of the various resistances of log converter 194 are chosen in a manner such that the current actually flowing through meter 196 is proportional to the log of the total emitter current of transistor Q37.

The diode-resistor circuit including CR248, CR249, and resistor 234 and the circuit including CR251, CR252, CR253, and resistor 236 that shunt the resistor 237 in the output lead are included primarily for temperature compensation, but they also help to smooth the log characteristic at the high readings.

The ground speed indicator 196 is a D.-C. meter that requires approximately 500 microamperes for full scale deflection. The meter pointer that is deflected is indicated at 238. The meter is adjusted to read correctly at low scale (100 knots) by a variable tap on a resistor 239. The high-scale calibration point (550 knots) is adjusted by the variable resistor 241.

TIME-TO-STATION DISPLAY

Refer to FIGS. 11, 12, 13 and 14. FIG. 11 shows the indicator display on which appears distance to ground station, ground speed, and from which may be read minutes to ground station. The face 242 of the indicator unit is mounted on the case 243 of the unit which may be attached to an instrument panel. The ground speed indicator meter 196 (FIG. 8) is mounted behind the face 242 with its pointer 238 positioned on the front to indicate ground speed on a logarithmic scale which reads from 80 knots to 600 knots clockwise.

The distance indicator 69 (FIG. 1) is also mounted behind the face 242 so that the distance to ground station shows through a window in the face. A circular slide-rule arrangement is provided so that the minutes to station may be read off the display. FIGS. 12 and 13 show the log scales for this slide-rule. FIG. 12 shows the ground speed scale as shown in FIG. 11 on the face 242. FIG. 13 shows inner and outer logarithmic scales on a rotatable ring 244 which, as shown in FIGS. 11 and 14, is rotatably mounted behind the face 242 with the inner scale showing through an annular opening in the face 242, and with the outer scale appearing through an opening at the bottom of the face 242. The inner scale reads from 100 minutes to 5 minutes clockwise; minutes to station are read off this scale. The outer scale reads from 200 miles to 10 miles clockwise. In operation, the ring 244 is rotated by turning a knob 246 until the figure on the outer scale opposite distance (dist) set matches the distance to station indication. The ground speed pointer 238 is now pointing to the minutes to station reading showing through the annular opening in the face 242. The situation illustrated in FIG. 11 is where the distance to ground station is 125 miles, the ground speed is 400 knots, and the time to ground station is 19 minutes.

Applicant's slide-rule arrangement uses three log scales instead of the usual two scales in order to provide (1) a conversion to minutes from hours, (2) a more convenient distance setting reference point on the indicator face, and (3) larger minutes and distance ranges without compressing or overlapping the scales.

To understand the operation of applicant's slide-rule arrangement, first compare it with an ordinary slide-rule, considering only the ground speed scale (FIG. 12) and the inner scale of the rotatable ring 244 (FIG. 13). Assume that the inner scale represents both distance and hours. Assume distance to station is 80 miles. Set 100 of the speed scale (corresponds to zero on a log scale) opposite 80 miles. Assume the ground speed is 200 knots. Then opposite 200 knots on the speed scale the time to station of 0.40 hour is read. It will be noted that in this example the log 80 minus log 200 equals log 40 (ignoring decimal points); thus the distance is divided by the speed to obtain time in the usual slide rule manner.

Referring particularly to FIG. 14, the scale-carrying ring 244 is attached to a supporting ring 247 which is rotatably supported by rollers 248 mounted on the case 243. There are four rollers 248 (only two shown) spaced 90 degrees apart. There is a gear 249 on the outer periphery of the ring 244 that meshes with a gear (not shown) on the shaft of knob 246 (FIG. 11) so that the ring 244 is rotated as the knob 246 is rotated.

For automatic setting of the distance scale as described later, a gear 251 may be mounted on the inner periphery of the ring 244 and made to mesh with a gear 277 which is driven by a shaft 269.

In order to multiply the inner scale reading by 60 so that it reads minutes instead of hours, the speed log scale may be extended to 60 as shown in FIG. 12 (60 is not marked on the actual display unit), and now 60 of the speed scale may be set opposite 80 miles on the inner scale (FIG. 13). Now, opposite 200 knots is read 24 minutes. This division of distance by speed and multiplication by 60 results from the following which may be observed on the scales:

Log distance—log speed—(log 1—log 60)=log time
(in minutes)

Which may be rewritten as:

Log distance—log speed+log 60=log time (in minutes)

In order to provide an indicator display that has a more convenient distant setting reference point than 60 on the speed scale and that has larger minutes and distance ranges without compressing or overlapping the scales, the distance set point is located beyond 60 on the speed scale (in the decreasing speed direction) to position it at the bottom of the indicator display. This displacement of the distance set point with respect to 60 in the present example happens to be a displacement of 54° 01′. In order to accommodate this shift of 54° 01′, the outer distance scale (FIG. 13) is shifted by this same amount with respect to the inner scale (FIG. 13). For example, the 100's on the inner and outer scales are 54° 01′ apart. It will be noted that these two scales have different limits in order to be more suitable with the DME distances and speeds of aircraft involved.

Shifting the distance set point on the speed scale a certain amount with respect to 60 on the speed scale, and shifting the outer scale in the same direction by the same amount with respect to the inner scale does not change the relation of the inner scale to the speed scale. Therefore, this shifting of the outer scale and the distance set point does not change the slide-rule action previously described. This fact will be appreciated by noting, for example, that when the distance set (at bottom of indicator display) is opposite 80 miles on the outer scale, 60 on the speed scale is opposite 80 on the inner scale. Thus, it is evident that minutes to station can be read off the inner scale as previously described.

The time to station indicator display above-described is of general application where distance to station and ground speed are known. For example, it may be used with DME of the type employing a conventional range servo motor. The above-identified Sofen and Crow application, for example, describes a DME of this type. In this type of DME the ground speed may be obtained in a known manner illustrated in FIG. 15. In FIG. 15 there is shown the conventional range potentiometer 261 with a variable tap 262 which is driven by the range servo motor as indicated by the dotted lines. A similar auxiliary range potentiometer 263 is provided which also has a variable tap 264 that is driven by the range servo motor as indicated by the dotted lines. The voltage on tap 264, which is proportional to distance is differentiated by differentiating circuit 266, 267 and the differentiated voltage is applied to a D.-C. amplifier 268. This differentiated voltage is proportional to speed. In other words, the differentiator output replaces the output of the first integrator 188 and feeds the amplifier 268, which may consist of chopper 189, A.C. amplifier 191, rectifier and second integrator 192 and D.C. amplifier 193. (FIGS. 7 and 8.) The output of amplifier 268 is converted to a log voltage and applied to a D.-C. meter that gives a reading of ground speed as previously described.

The presentation of time to station may be made fully automatic so that no manual setting of the distance scale by the knob 246 (FIG. 11) is required. One way of accomplishing this is to replace the knob 246 by a drive shaft 269 (FIGS. 14, 16 and 17) which is driven logarithmically by a linear distance shaft 271 such as the distance shaft driving the tap 262 on the range potentiometer 261 shown in FIG. 15. Or the shaft 271 may be driven by the servo stepper motor 46 (FIG. 1) through gearing that causes shaft 271 to make one rotation when the DME distance changes (in the present example) from zero miles to 200 miles.

In the example illustrated in FIGS. 16 and 17, the conversion from a linear distance input to a logarithmic distance output is obtained by a roller and cam plate arrangement. The shaft 271 drives a cam 272 mounted on a plate 273. The cam 272 comprises a ridge having the desired cam shape. A roller 274 mounted on the output shaft 269 is rotatably supported at one end by a block 276 that is rotatably mounted on the shaft 271. The roller 274 is held in contact with the cam ridge so that it and the output shaft 269 are rotated as the cam is rotated. The output shaft 269 is coupled through a gear 277 to the gear 251 driving the ring 244 (FIG. 13) carrying the two log scales. The gear ratio of gears 277 and 251 depends upon the diameter of roller 274, and is made such that the scale ring 244 rotates once for each rotation of the cam 272.

Thus, the distance scale (outer scale, FIG. 13) is always correctly positioned with respect to "dist set" (FIG. 11) as the DME is moving toward or away from the ground station, and the ground speed pointer always points to the correct time to station.

Instead of the roller and cam plate arrangement for providing the linear-to-logarithmic conversion, various other arrangements may be used for this conversion. For example, non-linear gears may be used; or an electrical system can be used such as one comprising a logarithmic potentiometer rotating with the linear distance shaft to provide a log input to a servo system which rotates the scale ring 244 (FIG. 13).

What is claimed is:

1. Radar apparatus of the automatic track-in-range type, said radar having means including servo means for making said radar automatically track in range, said servo means including a stepper servo motor having a plurality of windings, said servo means also including means for applying driving pulses to said windings in one sequence to drive said motor in one direction and in the opposite sequence to drive said motor in the opposite direction, and means for obtaining a voltage having an amplitude that is a function of the difference in the number of said driving pulses occurring in one sequence and the number of said driving pulses occurring in the opposite sequence whereby said voltage amplitude is proportional to the rate of change in range.

2. Radar apparatus of the automatic track-in-range type, said radar having means including servo means for making said radar automatically track in range, said servo means including a stepper servo motor having a plurality of windings, said servo means also including means for applying driving pulses to said windings in one sequence to drive said motor in one direction and in the opposite sequence to drive said motor in the opposite direction, a logic circuit to which said driving pulses are also applied as logic input pulses, said logic circuit having two output circuits and comprising means for supplying to one of said output circuits the logic input pulses that occur in one sequence and for supplying to the other output circuit the logic input pulses that occur in the opposite sequence, and means for obtaining a voltage having an amplitude that is a function of the difference in the number of pulses appearing in said one output circuit and the number of pulses appearing in the other of said output circuits whereby said voltage amplitude is proportional to the rate of change in range.

3. Distance measuring equipment (DME) of the pulse-radar automatic track-in-range type which operates in a track-in-range mode during reception of radar reply pulses to maintain reply pulses coincident with a range gate pulse, comprising a bidirectional ring counter, servo means including a stepper motor having a plurality of windings, said motor being for controlling the timing of the range gate pulse, means for driving said ring counter in one direction or the other to maintain said reply pulses coincident with the range gate, means coupling said ring counter to said motor for applying driving pulses to the windings of said motor for stepping it is one direction in response to said ring counter being driven in one direction and for stepping it in the other direction in response to said ring counter being driven in the other direction, a logic circuit to which are supplied input pulses corresponding to said driving pulses that are applied to the motor windings, said logic circuit having two output circuits, said logic circuit comprising means for supplying said input pulses to one of said output circuits in response to the input pulses occurring in one sequence and for supplying said input pulses to another of said output circuits in response to the input pulses occurring in the opposite sequence, and means for obtaining a voltage having an amplitude that is a function of the difference in the number of pulses appearing in said one output circuit and the number of pulses appearing in said other output circuit whereby said voltage amplitude is proportional to the rate of change of distance of the DME.

4. Radar apparatus of the automatic track-in-range type, said radar having means including servo means for making said radar automatically track in range, said servo means including a stepper servo motor having a plurality of windings, said servo means also including means for applying driving pulses to said windings in one sequence to drive said motor in one direction and in the opposite sequence to drive said motor in the opposite direction, a logic circuit to which said driving pulses are also applied as logic input pulses, said logic circuit having two output circuits and comprising means for supplying to one of said output circuits the logic input pulses that occur in one sequence and for supplying to the other output circuit the logic input pulses that occur in the opposite sequence, means for obtaining a voltage having an amplitude that is a function of the difference in the number of pulses appearing in said one output circuit and the number of pulses appearing in the other of said output circuits whereby said voltage amplitude is proportional to the rate of change in range, said last means including a first monostable multivibrator connected to be triggered by the pulses appearing in one of said logic output circuits, and including a second monostable multivibrator connected to be triggered by pulses appearing in the other of said logic output circuits, and further including a capacitor and means coupling said capacitor to said first and second multivibrators for charging said capacitor in one direction by the output pulses of one of said multivibrators and for charging it in the opposite direction by the output pulses of the other of said multivibrators whereby the voltage across said capacitor is said voltage having an amplitude that is proportional to the rate of change in range.

5. Distance measuring equipment (DME) of the pulse-radar automatic track-in-range type which operates in a track-in-range mode during reception of radar reply pulses, and which operates in a search-in-range mode in response to loss of radar reply pulses, said radar having means including servo means for making said radar automatically track in range, said servo means including a stepper servo motor having a plurality of windings, said servo means also including means for applying driving pulses to said windings in one sequence to drive said motor in one direction and in the opposite sequence to drive said motor in the opposite direction, a logic circuit to which said driving pulses are also applied as logic input pulses, said logic circuit having two output circuits and including means for applying said input pulses to one of said output circuits when they occur in one sequence and for applying said input pulses to the other of said output circuits when they occur in the opposite sequence, means for obtaining a voltage having an amplitude that is a function of the difference in the number of pulses appearing in one of said output circuits and the number of pulses appearing in the other of said output circuits whereby said voltage amplitude is proportional to the rate of change in range, said last means including a first monostable multivibrator connected to be triggered by the pulses appearing in one of said logic output circuits, and including a second monostable multivibrator connected to be triggered by pulses appearing in the other of said logic output circuits and further including a capacitor and means coupling said capacitor to said first and second multivibrators for charging said capacitor in one direction by the output pulses of one of said multivibrators and for charging it in the opposite direction by the output pulses of the other of said multivibrators whereby the voltage across said capacitor is said voltage having an amplitude that is proportional to the rate of change in range, and means for preventing said multivibrators from being triggered by the output pulses from said logic circuit when the DME is operating in the search-in-range mode.

References Cited by the Examiner

UNITED STATES PATENTS

| | | | |
|---|---|---|---|
| 2,776,425 | 1/1957 | Altman | 343—7.3 X |
| 2,978,698 | 4/1961 | Schultz et al. | 343—7.3 |

CHESTER L. JUSTUS, *Primary Examiner.*

T. H. TUBBESING, *Assistant Examiner.*